United States Patent [19]
Arai et al.

[11] Patent Number: 4,974,948
[45] Date of Patent: Dec. 4, 1990

[54] OPTICAL DEVICE FOR VARYING MAGIFICATION

[75] Inventors: Yasunori Arai; Takayuki Iizuka; Yoshihiro Yamazaki, all of Tokyo, Japan

[73] Assignee: Asahi Kogaku-Kogyo Kabushiki Kaisha, Tokyo, Japan

[21] Appl. No.: 315,901

[22] Filed: Feb. 27, 1989

[30] Foreign Application Priority Data

Feb. 26, 1988 [JP] Japan ................................ 63-43395
Aug. 12, 1988 [JP] Japan ............................... 63-201290

[51] Int. Cl.$^5$ ....................... G02B 15/15; G02B 27/36
[52] U.S. Cl. ................................................... 350/423
[58] Field of Search ............................... 350/423, 427

[56] References Cited

U.S. PATENT DOCUMENTS

| | | | |
|---|---|---|---|
| 4,397,544 | 8/1983 | Yajima et al. | 350/427 |
| 4,471,237 | 5/1984 | Arai . | |
| 4,497,573 | 2/1985 | Tokuhara et al. | 350/423 |
| 4,508,434 | 4/1985 | Ogawa . | |
| 4,597,641 | 7/1986 | Arai . | |
| 4,735,496 | 4/1988 | Arai . | |

FOREIGN PATENT DOCUMENTS 57-51081 10/1982 Japan .
58-126512 7/1983 Japan .
59-48723 3/1984 Japan .

OTHER PUBLICATIONS

An abstract of Japanese Unexamined Patent Publication No. 50-138823.
English language abstracts of Japanese Unexamined Patent Publication Nos. 59-488723 and 58-126512.

*Primary Examiner*—Rodney B. Bovernick
*Assistant Examiner*—Rebecca D. Gass
*Attorney, Agent, or Firm*—Sandler, Greenblum & Bernstein

[57] ABSTRACT

An optical device for varying magnification, having an object plane on which an object is to be located, a light receiving surface, and an imaging lens unit for focusing an image of the object located on the object plane onto the light receiving surface, so that upon varying the magnification, an optical distance between the object plane and the light receiving surface can be changed, wherein the imaging lens unit includes a main lens group and a correcting lens group that are movable relative to each other, the main lens group or the correcting lens group being fixed with respect to the light receiving surface, the correcting lens group or the main lens group being movable to the object plane and the light receiving surface to vary the magnification.

36 Claims, 29 Drawing Sheets

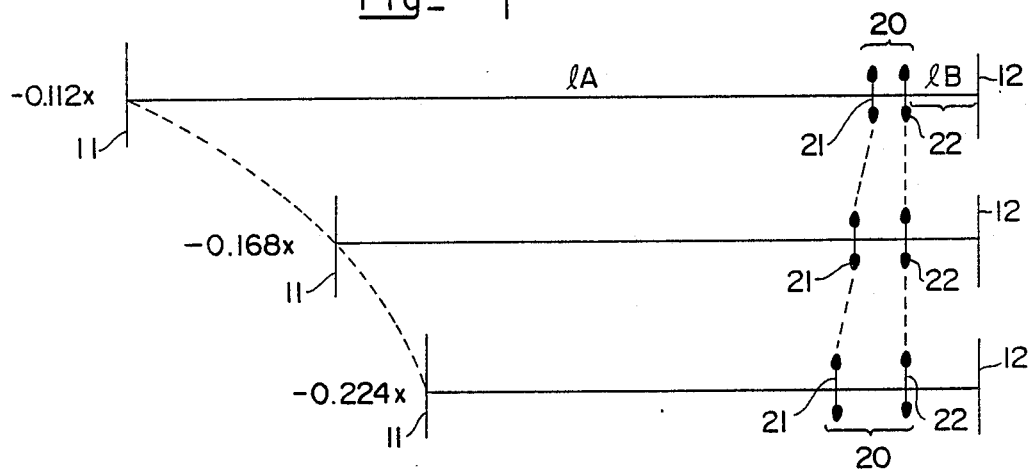
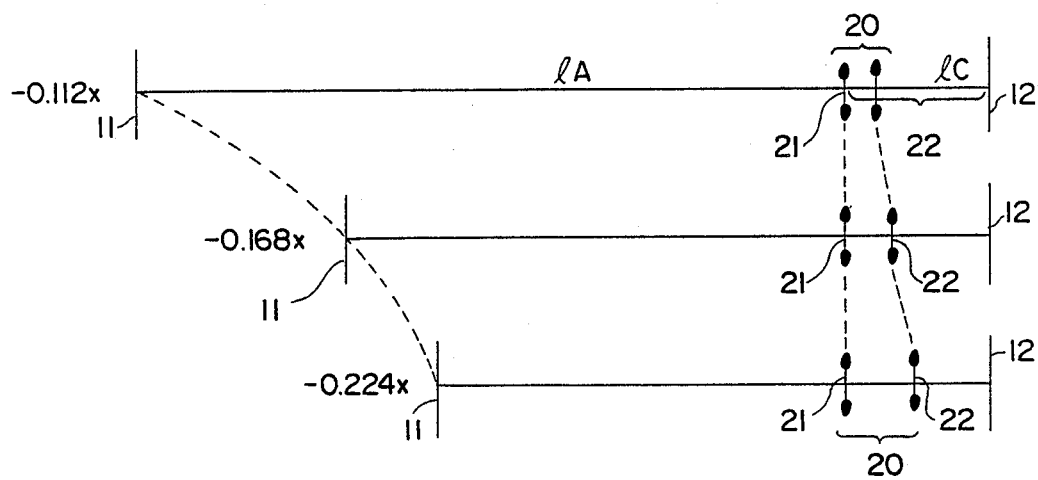
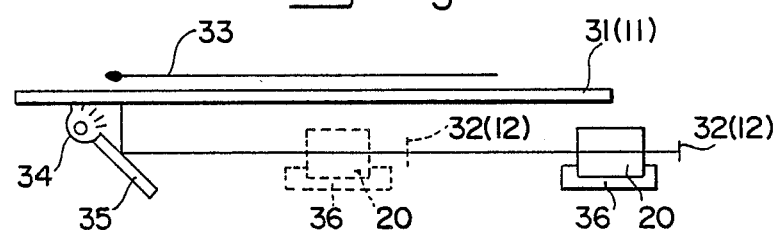

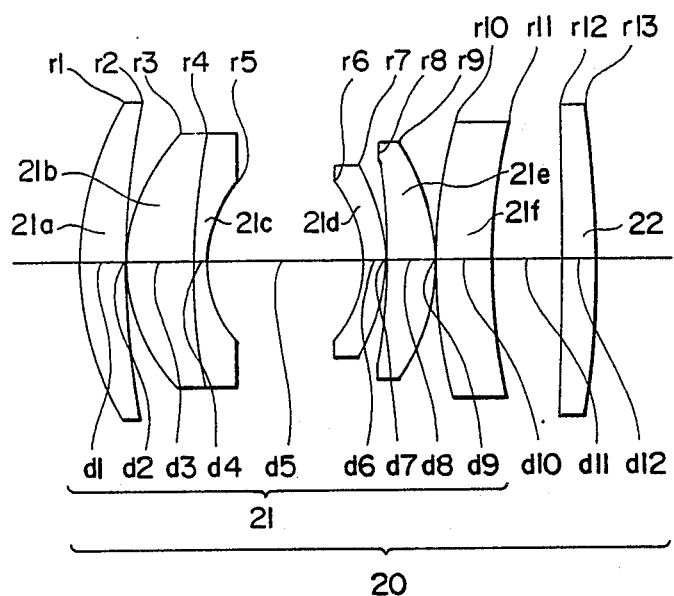
Fig-4
y=0
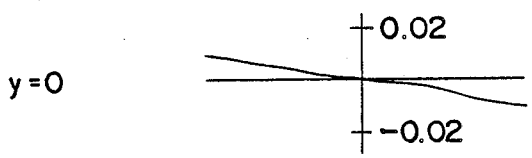
y=-6
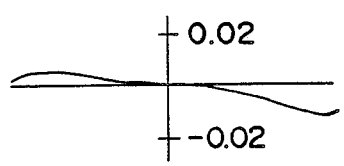
y=-12
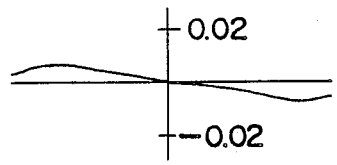
y=-14.4
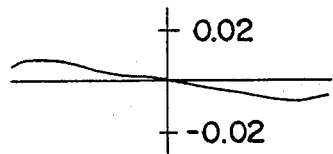
Fig- 5

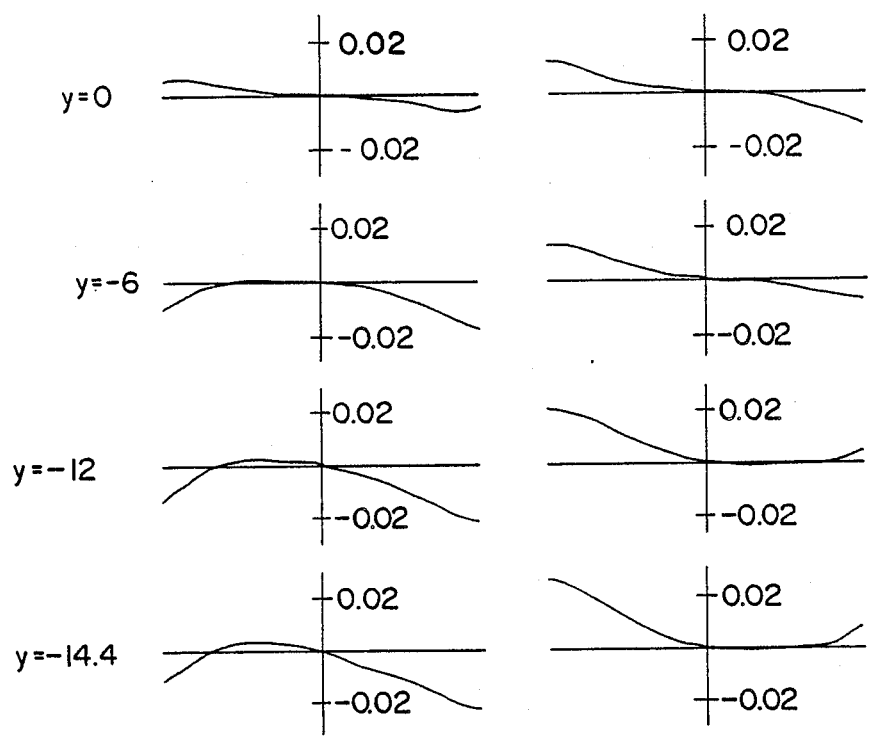

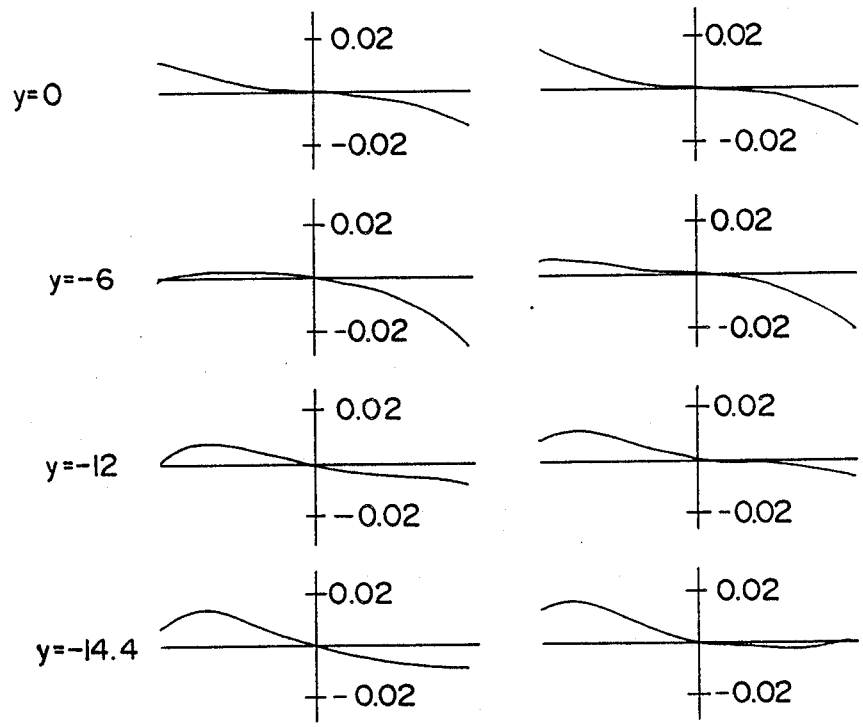

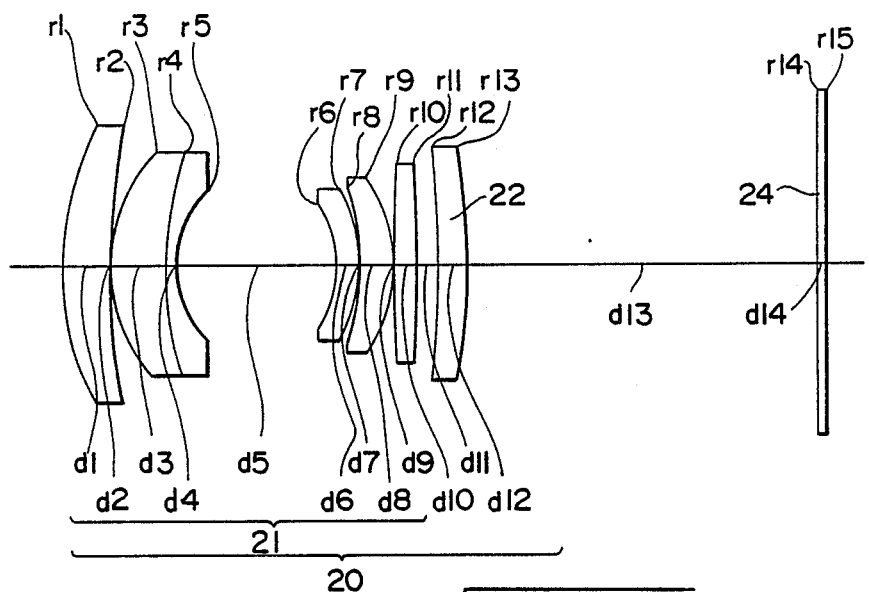
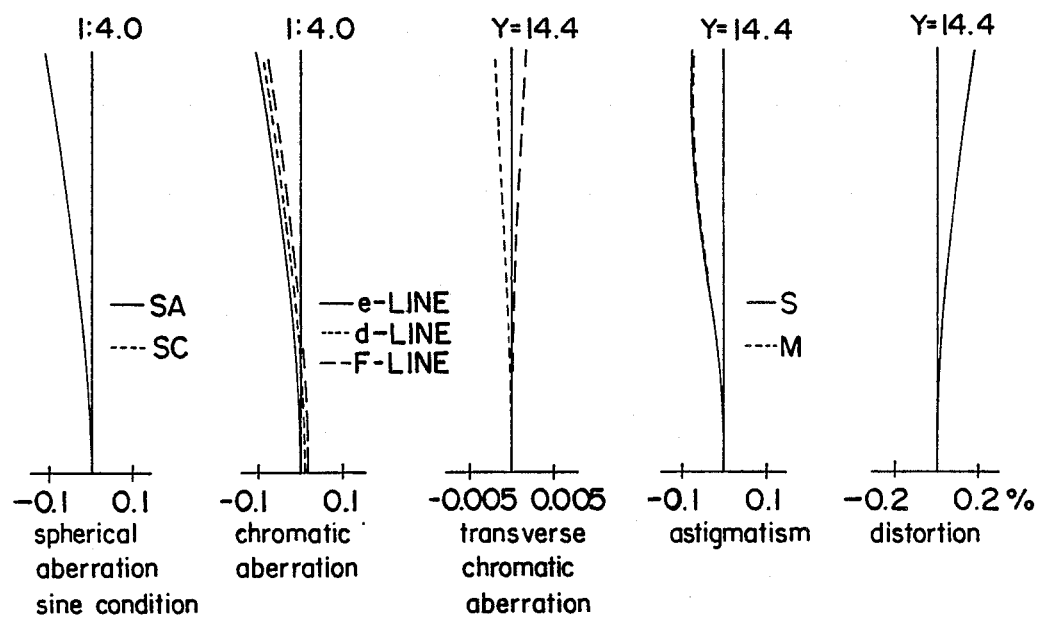

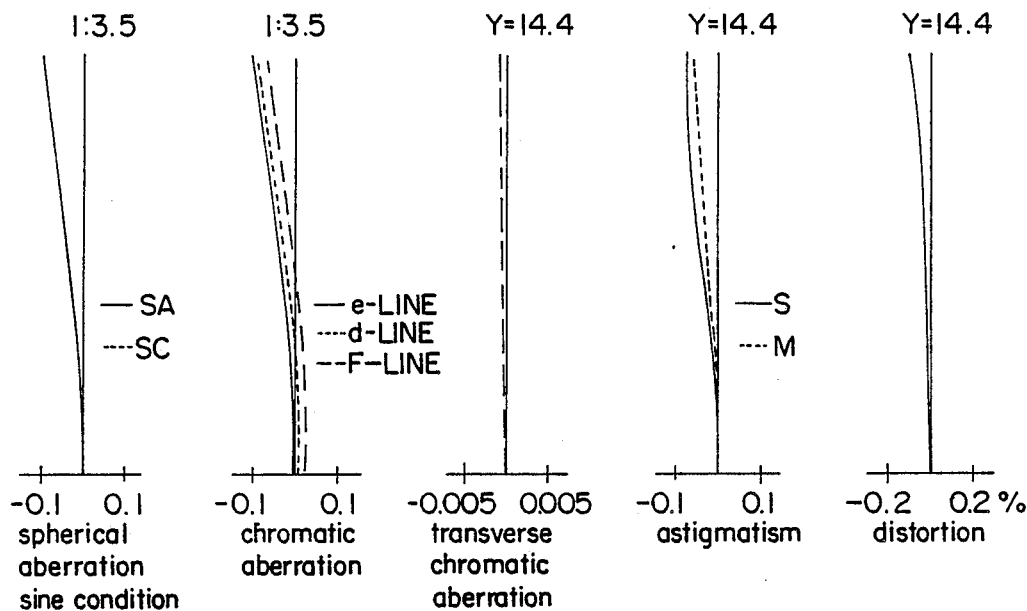
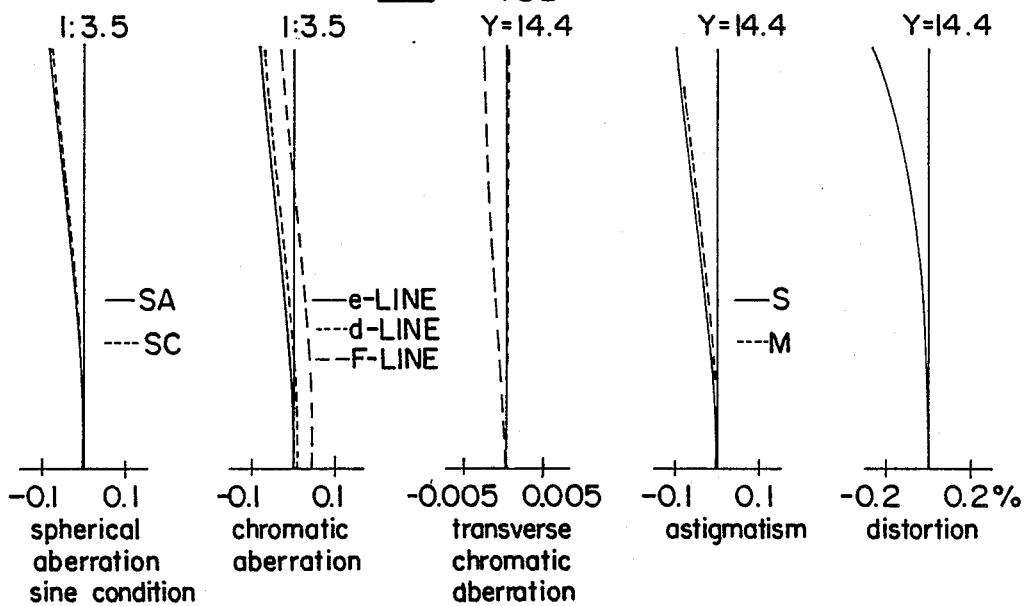

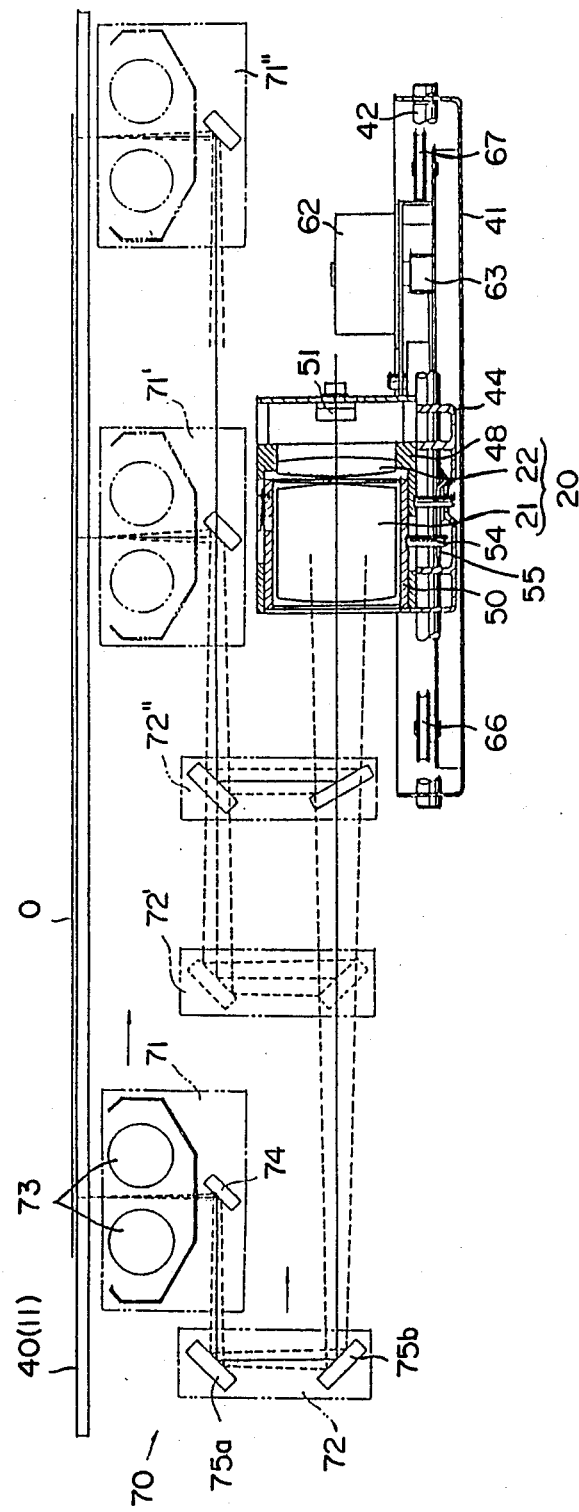

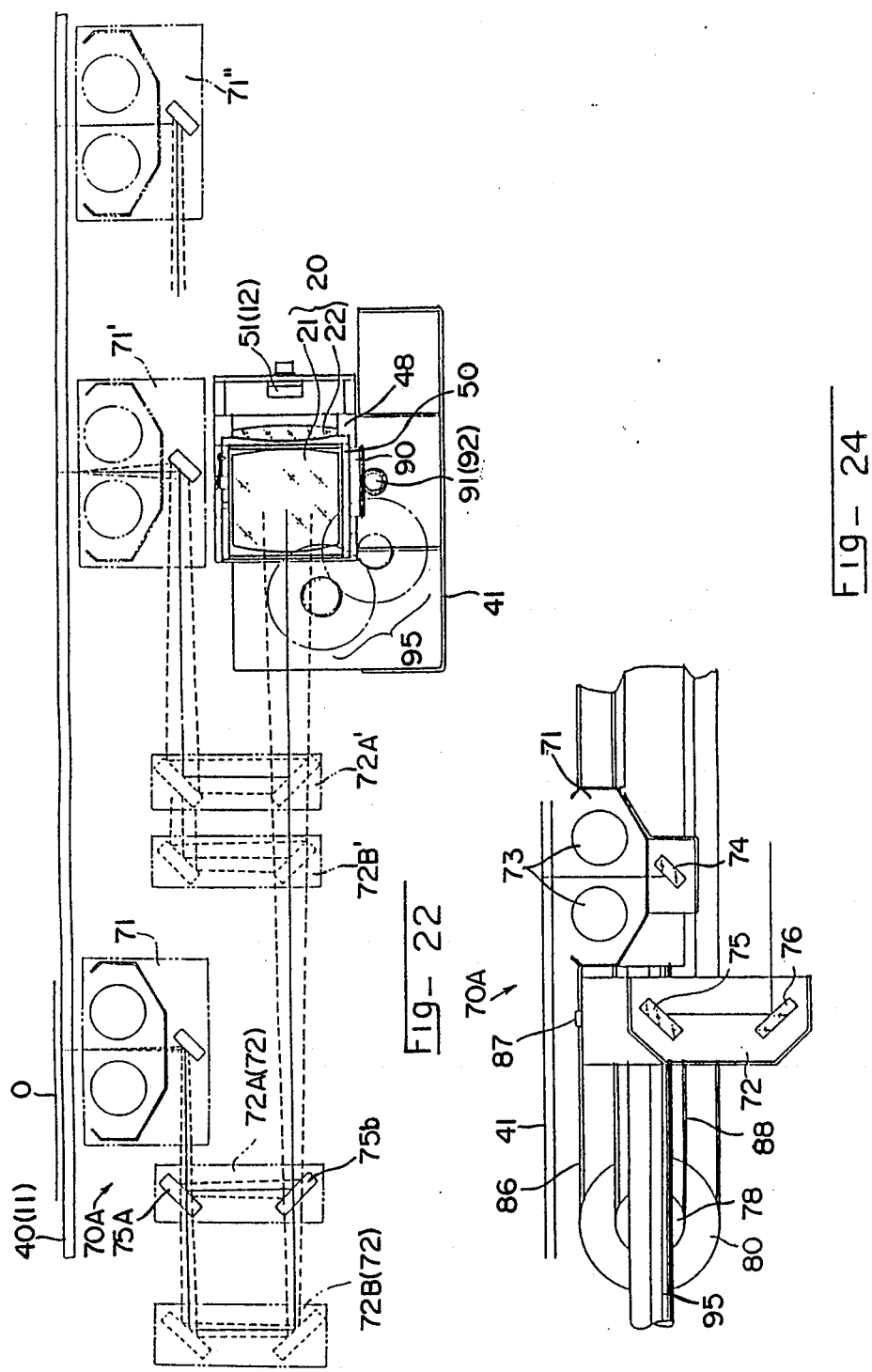

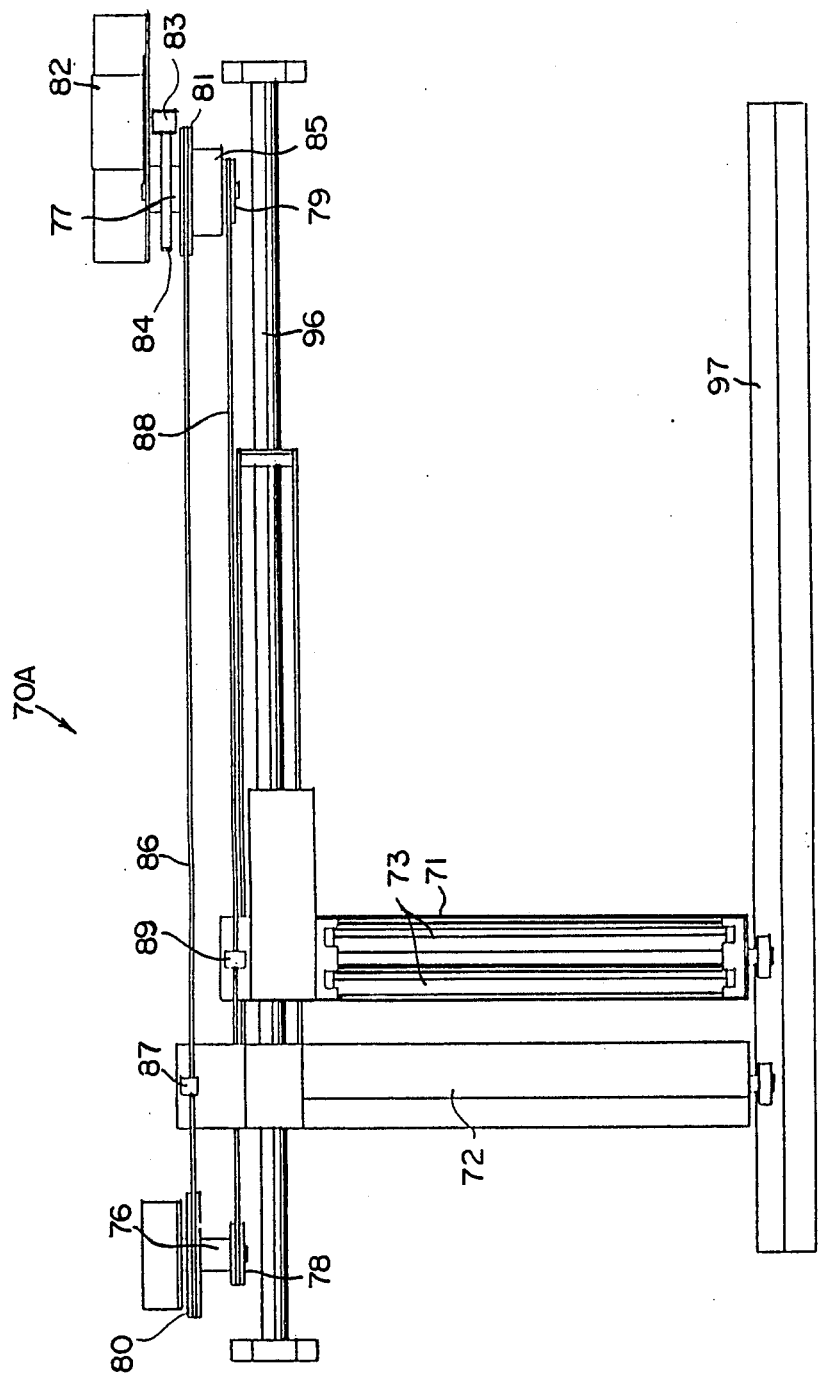

OPTICAL DEVICE FOR VARYING MAGIFICATION

BACKGROUND OF THE INVENTION

1. Field of the Invention

The present invention relates to a magnification varying optical device (an image reading device) for giving magnified information of an object to a light receiving plane, and more precisely it relates to an optical device for varying a magnification by changing a distance between an object and an image thereof.

2. Description of Related Art

A magnification varying optical device (image reading device) is usually used in a copying machine having a variable power, an image scanner, a facsimile, or a digital copying machine, or the like, in which a photoelectric element, such as a CCD is used as a light receiving element.

There are mainly two types of magnification varying devices, one of which has a zoom lens system for keeping constant a distance between an object and an image, the other type having an imaging lens having a fixed focus, in which the magnification is varied by changing the distance between the object and the image, as well as the position of the imaging lens. The former type, in which the zooming lens system is used, has advantages in that a high precision variation of power (magnification) can be effected and that the distance between the object and the image is constant. Since the former type device includes a large and expensive zoom lens, it can not be applied to an optical instrument or system which must be compact and inexpensive.

On the other hand, the latter type of magnification varying device, in which an imaging lens having a fixed focus is used, is less expensive, but has a drawback in that when the fixed focus lens is moved relative to an object plane and an image plane to vary the magnification, the imaging efficiency deteriorates, since the fixed focus lens is usually designed so that a clearest image is formed at a specific magnification.

SUMMARY OF THE INVENTION

The primary object of the present invention is to provide a small and inexpensive magnification varying device in which the magnification is controlled by changing the distance between an object and an image (which will be referred to as an object-image distance), while obtaining a high imaging efficiency in the total magnification.

In a magnification varying optical device which varies the magnification by changing the object-image distance, the use of an imaging lens which is composed a relatively movable main lens and correcting lens which are relatively moved, in accordance with the magnification, does not substantially deteriorate the imaging efficiency. Thus, it is possible to fix one of the main and correcting lenses with respect to the light receiving surface.

To achieve the above mentioned object there is provided an optical device for varying the magnification of a device having an object plane on which an object is to be located, a light receiving surface, and an imaging lens unit for focusing an image of the object located on the object plane onto the light receiving surface, so that upon varying the magnification, an optical distance between the object plane and the light receiving surface can be changed. The imaging lens unit comprises a main lens group and a correcting lens group, movable relative to each other. One of the main lens group and correcting lens group is fixed with respect to the light receiving surface so as the other lens group being movable to the object plane and the light receiving surface to vary the magnification.

With this arrangement, since only one optical element in the imaging lens system is movable, the mechanism for moving the lens can be simplified in comparison with a conventional magnification varying device in which a zoom lens system is used, as mentioned above, and the change of magnification does not cause the deterioration of the imaging efficiency.

In a preferred embodiment, the correcting lens group comprises a rear lens group which is fixed with respect to the light receiving surface and the main lens group comprises a movable front lens group. In this arrangement, the main lens group moves toward the object as the magnification increases. In this embodiment, the correcting lens group has a positive power which is preferably less than half the positive power of the whole imaging lens unit (system). Namely, supposing that the focal length of the whole imaging lens system is f, and the focal length of the correcting lens group is $f_F$, the ratio of the focal lengths is preferably $0 < f/f_F < 0.5$. If the power is not positive (i.e. $0 \geq f/f_F$), the rear lens group, i.e., the correcting lens group can not be fixed. If the positive power is larger than 0.5 (i.e. $f/f_F \geq 0.5$), it is impossible to correct the focus within the total magnification range magnification.

When the rear lens group, i.e., the correcting lens group is fixed and the front lens group, i.e., the main lens group is movable, both the main lens group and the correcting lens group have positive power. In this case, if the focal lengths of the main lens group and the correcting lens group are $f_B$ and $f_A$, respectively, the ratio of the focal lengths is preferably $2 < f_B/f_A < 8$ so as to achieve better aberration correction. If the ratio is below 2, an excess aberration correction, especially an excess coma correction occurs and a large displacement of the front lens group takes place. On the contrary, if the ratio is above 8, no sufficient aberration correction (coma correction) effect can be obtained. To obtain higher imaging efficiency, the ratio of $f_B$ and $f_A$ is $2.5 < f_B/f_A < 6$.

Furthermore, the present invention proposes a concrete construction for moving one of the main lens group and the correcting lens group exactly to a desired position.

A magnification varying optical device of the type mentioned above has a movable base to which one of the main lens group and the correcting lens group is attached other lens group is supported on a movable base so as to move in the optical axis direction of the device, and further comprises variable power means for moving the movable base in the optical axis direction to change a distance between the object plane and the movable base, upon varying the magnification. Correcting mean is provided for moving the movable lens group on the movable base to a predetermined position in accordance with the movement of the movable base.

Preferably, the magnification varying optical device has a stationary base having a guide bar secured thereto. The movable base is movably supported by the guide bar, so that the movement of the movable base can be controlled by a pulse motor. The movable base has a cam lever pivoted thereto which is connected at one end to a main or correcting lens group that is movably supported on the movable base. The cam lever is engaged at its opposite end by a cam surface that is formed integral with the stationary base to move the movable main lens group or correcting lens group to a predetermined position in accordance with the movement of the movable base.

Alternatively, it is also possible to provide an additional pulse motor which drives the movable main lens group or correcting lens group through a gear train.

In the arrangements mentioned above, the light receiving surface is moved to change the object-image distance. Alternatively, it is also possible to change the object-image distance without moving the light receiving surface and the object plane. In this alternative, the improvement is directed to the mean for scanning the object plane. Namely, there is provided an optical device for varying the magnification, having a fixed object plane on which an object is to be located, a fixed light receiving surface, and an imaging lens unit for focusing an image of the object located on the object plane onto the light receiving surface. Upon varying the magnification, an optical distance between the object plane and the light receiving surface is changed. The imaging lens unit comprises a main lens group and a correcting lens group, which are movable relative to each other, one of the main lens group and the correcting lens group being fixed with respect to the light receiving surface. Means for adjusting the movement of the other movable main lens group or correcting lens groups is provided, along with a first carriage which includes an illumination light source for scanning the fixed object plane and a first mirror which reflects the light reflected by the object plane into a direction parallel with the object plane. A second carriage includes a second mirror and a third mirror which reflect the light reflected by the first mirror into the opposite direction to be incident upon the imaging lens unit. A scan driving means moves the first and second carriages at a speed ratio of approximately 2:1 in a same direction parallel with the object plane, and an object-image distance adjusting means changes the initial positional relationship between the first and second carriages in accordance with the magnification.

With this arrangement, both the light receiving surface and the object plane can be fixed so as to be immovable. Accordingly, one of the main lens group and the correcting lens group can be stationary.

Preferably, the scan driving means comprises a pair of endless wires connected to the first and second carriages, a pair of coaxial pulleys around which the endless wires are wound and which have a diameter ratio of approximately 1:2, and a pulse motor for rotating the coaxial pulleys.

Preferably, the object-image distance adjusting means comprises a clutch mechanism provided between the pulleys.

BRIEF DESCRIPTION OF THE DRAWINGS

The invention will be described below in detail with reference to the accompanying drawings in which:

FIGS. 1 and 2 are schematic views showing positional relationships between optical elements in a magnification varying device according to two different embodiments of the present invention;

FIG. 3 is a front elevational view of a magnification varying device according to an embodiment of the present invention;

FIG. 4 is a sectional view of an imaging lens unit used in the present invention according to example 1;

FIG. 5 is a diagram showing a coma of the imaging lens unit at m=0.168× (m:magnification);

FIGS. 7A and 7B are diagrams showing a coma at m=0.112× and m=0.224× respectively when the correcting lens group of the imaging lens unit shown in FIG. 4 is moved together with the main lens group;

FIGS. 10A and 10B are diagrams showing a coma at m=0.112× and m=0.224× respectively when the correcting lens group of the imaging lens unit shown in FIG. 8 is immovable and the main lens group is moved;

FIGS. 12A, 13A, 14A, 15A, 16A, 17A and 18A are sectional views of examples 3-9 of the construction of an imaging lens unit used in the present invention, FIGS. 12B, 13B, 14B, 15B, 16B, 17B and 18B are schematic views of an aberration of the imaging lens units shown in FIGS. 12A, 13A, 14A, 15A, 16A, 17A and 18A at m=0.112×, respectively;

FIGS. 12C, 13C, 14C, 15C, 16C, 17C and 18C are schematic views of an aberration of the imaging lens unit shown in FIGS. 12A, 13A, 14A, 15A, 16A, 17A and 18A at m=0.168×, respectively;

FIGS. 12D, 13D, 14D, 15D, 16D, 17D and 18D are schematic views of an aberation of the imaging lens unit shown in FIGS. 12A, 13A, 14A, 15A, 16A, 17A and 18A at m=0.224×, respectively;

FIG. 19 is a front elevational view of a magnification varying device according to an aspect of the present invention;

FIG. 22 is a front elevational view of a magnification varying device according to another aspect of the present invention;

FIG. 23 is a plan view of an illumination scanning mechanism shown in FIG. 22;

FIG. 24 is a front elevational view of FIG. 23;

DETAILED DESCRIPTION OF PREFERRED EMBODIMENTS

Figures 6A, 6B:
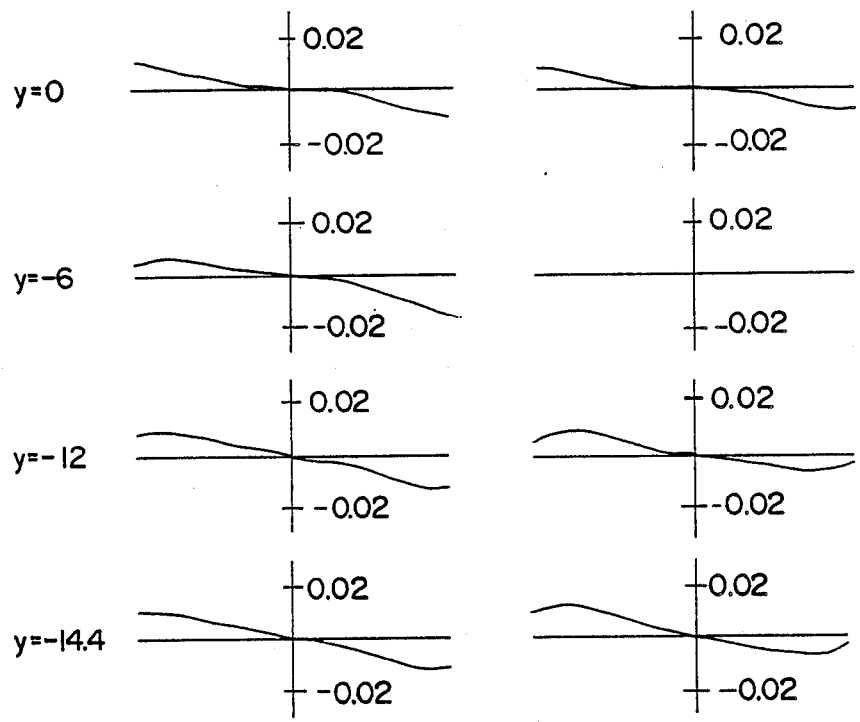
FIGS. 6A and 6B are diagrams showing a coma at m=0.112× and m=0.224× respectively when the correcting lens group of the imaging lens unit shown in FIG. 4 is immovable and the main lens group is moved.

The following discussion will be addressed to preferred embodiments of the present invention.

FIG. 1 shows a first embodiment of a magnification varying device according to the present invention, in which an imaging lens unit 20 is provided between an object plane 11 and a light receiving surface 12. The imaging lens unit 20 has a main lens group (front lens group) 21 and a correcting lens group (rear lens group) 22 which is fixed with respect to the light receiving surface 12, so that the distance $l_A$ between the correcting lens group 22 and the light receiving surface 12 is constant. Both the main lens group 21 and the correcting lens group 22 have positive powers. The magnification (power) can be varied by moving the main lens group 21 of the imaging lens unit 20 in relation to the correcting lens group 22 and by moving the object plane 11 in relation to the light receiving surface 12. Namely, the distance $l_A$ between the object plane 11 and the main lens group 21 of the imaging lens unit 20 varies in accordance with the magnification.

In the illustrated embodiment, as the magnification increases (m=0.112×→0.168×→0.224×), the object plane 11 comes closer to the light receiving surface 12, and the main lens group 21 moves away from the correcting lens group 22 to come closer to the object in order to form an image of an object located on the object plane 11 on the light receiving surface 12.

In the first embodiment, the imaging lens unit 20 has a positive power as a whole in view of the property for forming an image. The correcting lens group 21 has a positive power for the purpose of making the focal point coincident with the light receiving surface 12 when the magnification is increased. Supposing that the focal lengths of the correcting lens group 21 and the whole imaging lens unit 20 are $f_F$ and f, respectively, the ratio is preferably $0 < f/f_F < 0.5$. If $0 \geq f/f_F$, the correcting lens group can not be fixed. If $f/f_F \geq 0.5$, it is very difficult to adjust the focus in the total range of magnification.

FIG. 2 shows a second embodiment of the present invention in which the main lens group 21 is fixed (immovable) with respect to the light receiving surface 12 and the correcting lens group 22 is movable relative to the main lens group 21. The construction of the second embodiment is similar to that of the first embodiment. In the second embodiment, the distance $l_c$ between the main lens group 21 and the light receiving surface 12 is constant and the correcting lens group 22 moves away from the main lens group 21 and comes close to the light receiving surface 12 as the magnification increases.

FIG. 3 shows an optical apparatus to which the present invention is applied. In FIG. 3, a glass plate (or contact plate) 31, on which a document (i.e. a sheet of, paper etc.) is located, corresponds to the object plane 11 in the above-mentioned embodiments. A CCD (Charge Coupled Device) 32 corresponds to the light receiving surface 12. The glass plate 31 which carries a document (object) 33 moves in the direction of the plane thereof. Below the glass plate 31, is a light source 34 for illuminating the document 33 and a mirror 35 which reflects an image (light) of the document 33, so that the image is incident upon the CCD 32 through the imaging lens unit 20. In the illustrated embodiment, a lens support 36, which supports the imaging lens unit 20 and the CCD 32, move away from and close to the mirror 35, as shown by an imaginary line in FIG. 3 so as to control the magnification by changing the object-image distance. The lens support 36 fixes one of the main lens group 21 and the correcting lens group 22 and moves the other in a predetermined relationship.

Examples of the imaging lens unit 20 are shown below. The following examples correspond to the embodiments shown in FIG. 1.

[EXAMPLES 1]

Table 1 and FIG. 4 show a first example. In FIG. 4, lenses 21a~21f constitute an integral main lens group 21, and the correcting lens group 22 is composed of a single lens. The main lens group 21 includes a first lens unit made of a positive meniscus lens 21a with a convex surface located adjacent to the object, a second lens unit made of a negative meniscus lens 21b with a convex surface located adjacent to the object and negative lens 21c, a third lens unit which includes at least a negative meniscus lens 21d with a concave surface adjacent to the object and which further includes as an optical element, a positive meniscus lens 21e with a convex surface adjacent to the object, and a fourth lens unit made of a positive lens 21f. The first, second, third and fourth lens units are located in this order as viewed from the object. The correcting lens group 22, is composed of the single positive lens 22 which has a convex surface having a small radius of curvature that is located adjacent to the image plane.

TABLE 1

| | | | | | | | |
|---|---|---|---|---|---|---|---|
| F = | 4.0 | | | | | | |
| | 0.112x~0.168x~0.224x | | | | | | |
| f = | 39.149~39.916~40.721 | | | | | | |
| $d_{11}$ = | 2.05~4.92~7.81 | | | | | | |
| $l_A$ = | 370.37~314.95~261.77 | | | | | | |
| $l_B$ = | 19.52 (constant) | | | | | | |
| $r_1$ | 22.28 | $d_1$ | 3.29 | $n_1$ 1.80440 | | $\nu_1$ 39.6 | |
| $r_2$ | 52.26 | $d_2$ | 0.10 | | | | |
| $r_3$ | 13.14 | $d_3$ | 4.70 | $n_3$ 1.79952 | | $\nu_3$ 42.2 | |
| $r_4$ | 39.37 | $d_4$ | 1.10 | $n_3$ 1.80518 | | $\nu_3$ 25.4 | |
| $r_5$ | 8.69 | $d_5$ | 11.14 | | | | |
| $r_6$ | −9.41 | $d_6$ | 1.70 | $n_4$ 1.80518 | | $\nu_4$ 25.4 | |
| $r_7$ | −13.36 | $d_7$ | 0.20 | | | | |
| $r_8$ | −44.38 | $d_8$ | 3.52 | $n_5$ 1.69680 | | $\nu_5$ 55.5 | |
| $r_9$ | −14.90 | $d_9$ | 0.10 | | | | |
| $r_{10}$ | 41.20 | $d_{10}$ | 4.00 | $n_6$ 1.69680 | | $\nu_6$ 55.5 | |
| $r_{11}$ | 42.56 | $d_{11}$ | change | | | | |
| $r_{12}$ | −391.39 | $d_{12}$ | 2.50 | $n_7$ 1.71300 | | $\nu_7$ 53.9 | |
| $r_{13}$ | −76.59 | | | | | | |

$r_i$: radius of curvature of No. i surface
$d_i$: distance between No. i surface and No. (i + 1) surface
$n_i$: refractive index of D-lines of No. i lens
$\nu_i$: Abbe's number of No. i lens
f: focal length (e-line) of the imaging lens unit 20 as a whole
$l_A$: distance of the main lens group 21 from the object plane 11
$l_B$: distance of the correcting lens group 22 from the light receiving surface 12

FIG. 5 shows a coma (e-line) at m=0.168× (design value) of the imaging lens unit 20 as mentioned above. FIGS. 6A and 6B show a coma (e-line) at m=0.112× and m=0.224× respectively under the condition that the correcting lens group 22 is fixed with respect to the light receiving surface 12 and the main lens group 21 moves as shown in Table 1 above. As can be understood from the foregoing, the comas at m=0.112× and m=0.224× are almost identical to that at m=0.168×. FIGS. 7A and 7B show comas at m=0.112× and m=0.224× respectively when the correcting lens group 22 is moved together with the main lens group 21. This shows that almost no deterioration of the coma is caused in the present invention. Note that in this example, $f/f_F = 0.301$ which satisfies the relationship given by $0 < f/f_F < 0.5$.

[EXAMPLE 2]

Figure 8:
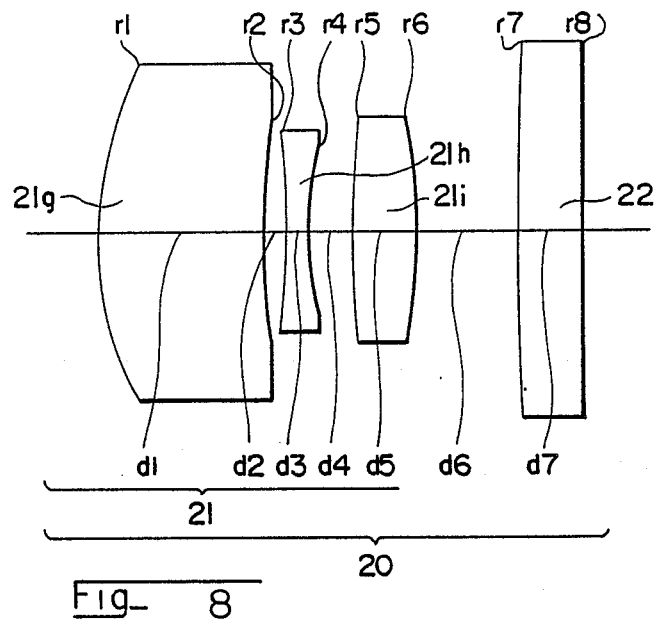
FIG. 8 is a sectional view of an example of the construction of an imaging lens unit used in the present invention according to example 2.

Table 2 and FIG. 8 show a second example. In FIG. 8, lenses 21g~21i constitute an integral main lens group 21 and the correcting lens group 22 is composed of a single lens. The main lens group 21 includes a first lens unit made of a positive lens 21g, a second lens unit made of a negative lens 21h with opposed concave surfaces, and a third lens unit made of a positive lens 21i. The first, seond and third lens units are located in this order as viewed from the object. The correcting lens group 22 is composed of a single positive lens 22 which has a surface having a small radius of convex curvature that is located adjacent to the object.

TABLE 2

```
F  =  5.0
      0.112x~0.168x~0.224x
f  =  29.905~30.001~30.098
d₆ =  1.12~2.96~4.81
l_A = 295.92~207.49~163.27
l_B = 25.0 (constant)
```

| | | | | | |
|---|---|---|---|---|---|
| $r_1$ | 10.37 | $d_1$ | 4.77 | $n_1$ 1.80400 | $\nu_1$ 46.6 |
| $r_2$ | 20.03 | $d_2$ | 0.61 | | |
| $r_3$ | −25.15 | $d_3$ | 0.70 | $n_2$ 1.74077 | $\nu_2$ 27.8 |
| $r_4$ | 11.33 | $d_4$ | 1.26 | | |
| $r_5$ | 30.43 | $d_5$ | 1.83 | $n_3$ 1.83481 | $\nu_3$ 42.7 |
| $r_6$ | −18.07 | $d_6$ | change | | |
| $r_7$ | 161.87 | $d_7$ | 1.80 | $n_4$ 1.77250 | $\nu_4$ 49.6 |
| $r_8$ | 259.34 | | | | |

$r_i$: radius of curvature of No. i surface
$d_i$: distance between No. i surface and No. (i + 1) surface
$n_i$: refractive index of D-lines of No. i lens
$\nu_i$: Abbe's number of No. i lens
f: focal length (e-line) of the imaging lens unit 20 as a whole
$l_A$: distance of the main lens group 21 from the object plane 11
$l_B$: distance of the correcting lens group 22 from the light receiving surface 12

Figure 9:
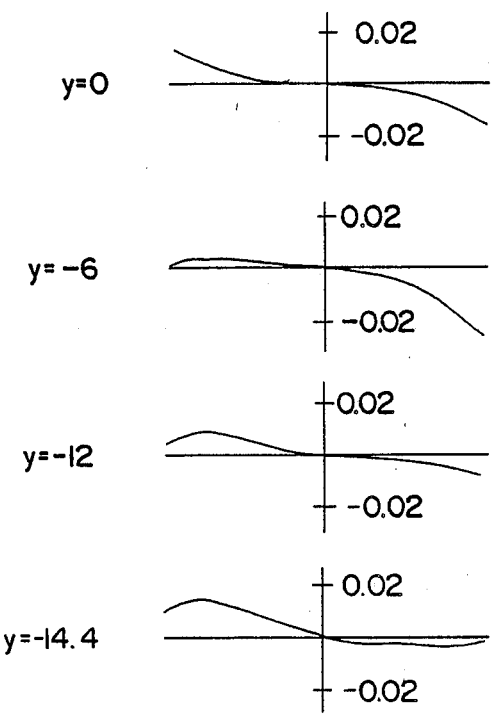
FIG. 9 is a diagram showing a coma of the imaging lens unit shown in FIG. 8 at m=0.168×.
Figures 11A, 11B:
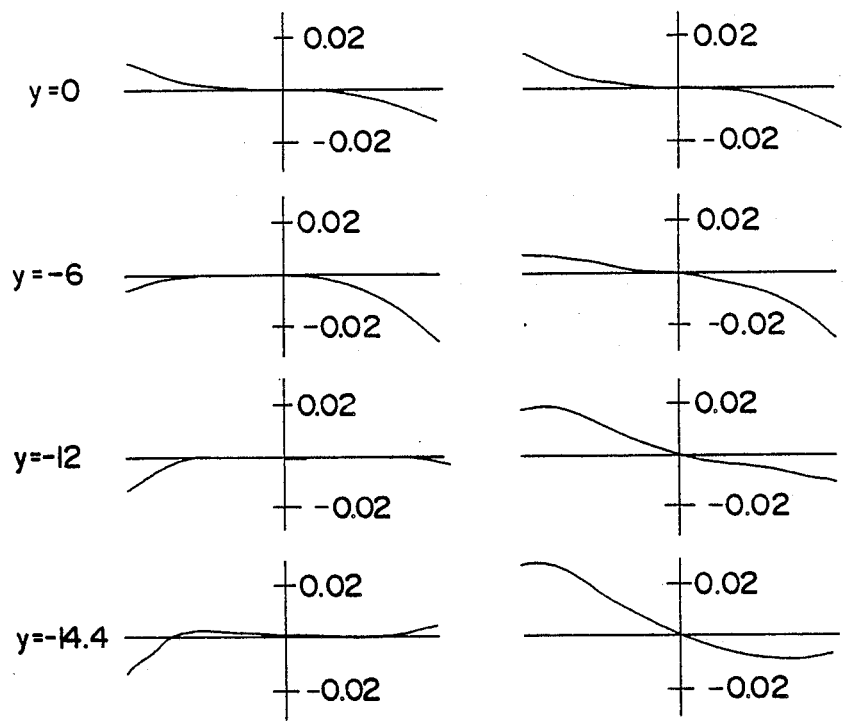
FIGS. 11A and 11B are diagrams showing a coma at m=0.112× and m=0.224× respectively when the correcting lens group of the imaging lens unit shown in FIG. 8 is moved together with the main lens group.
Figure 12A:
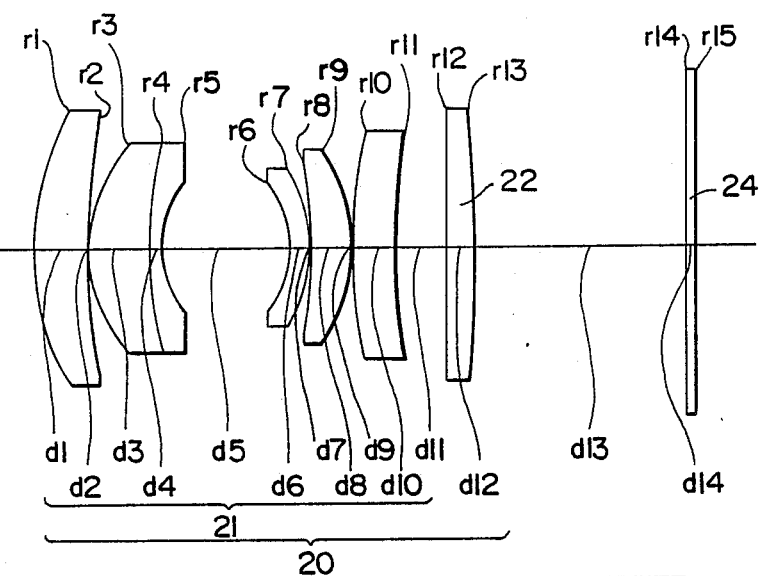
Figure 12B:
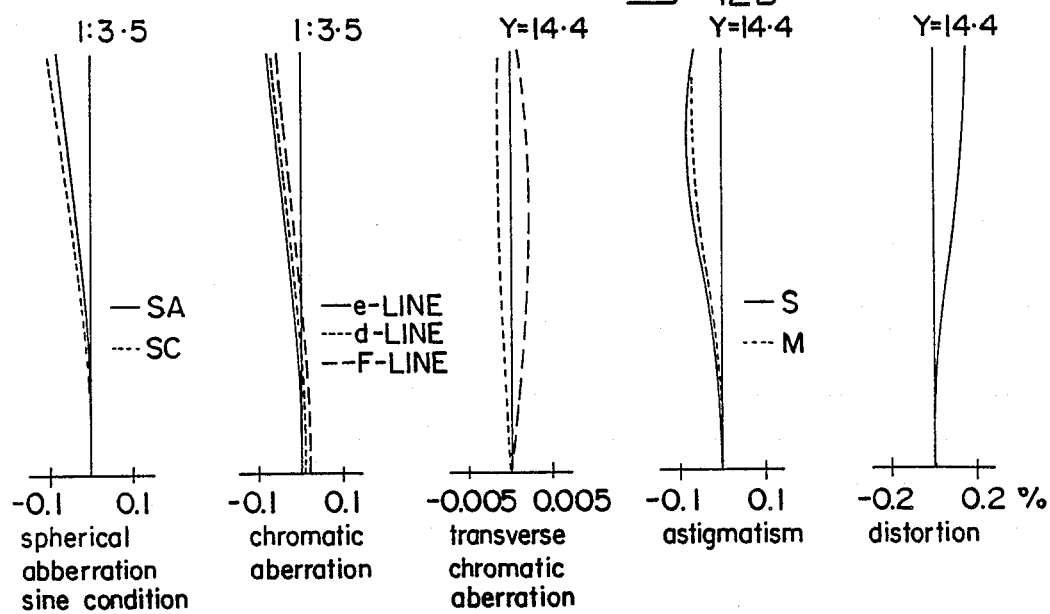
Figure 12C:
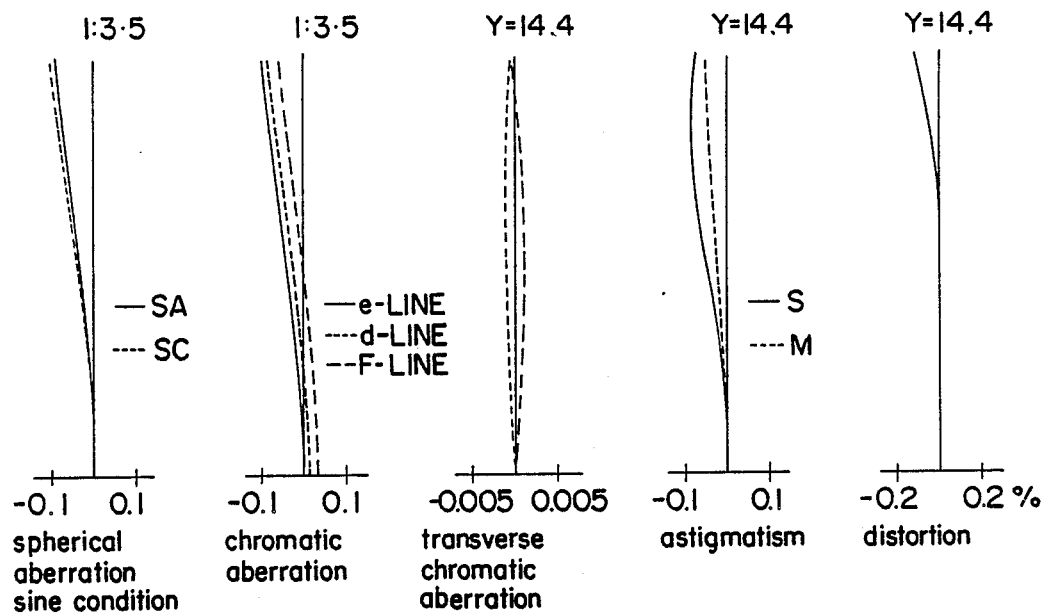
Figure 12D:
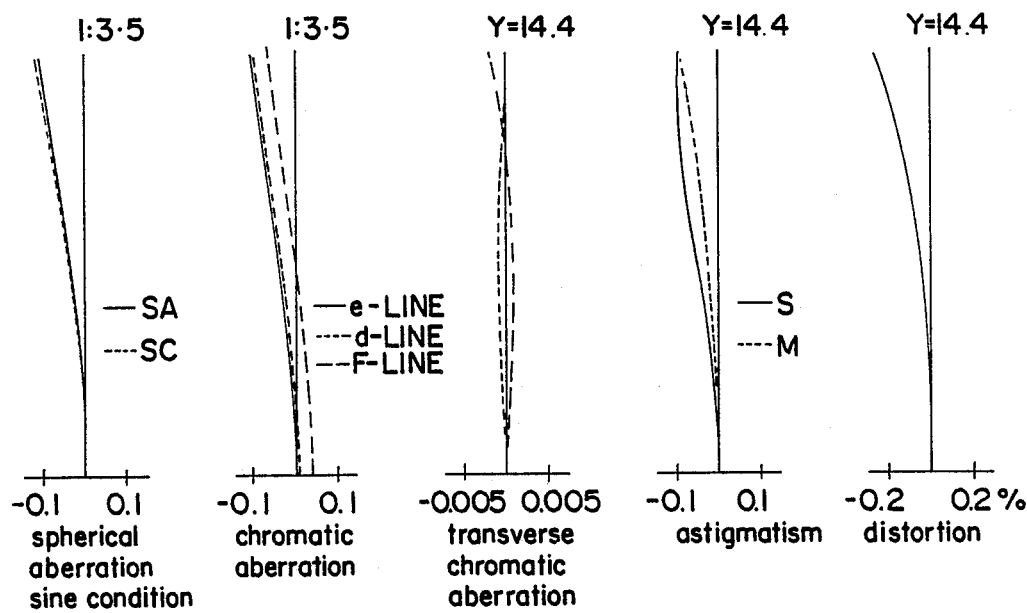
Figure 13C:
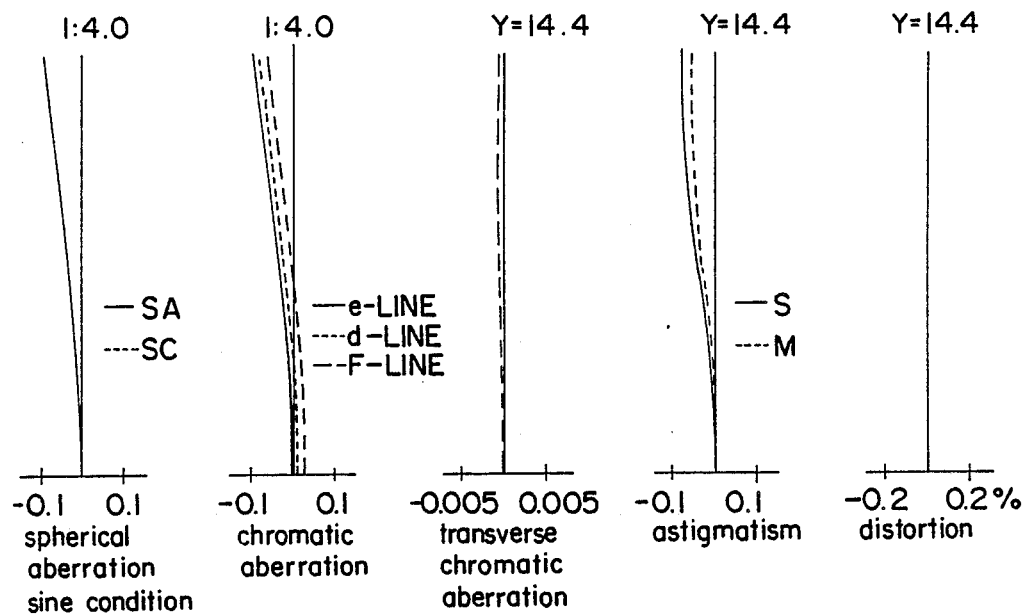
Figure 13D:
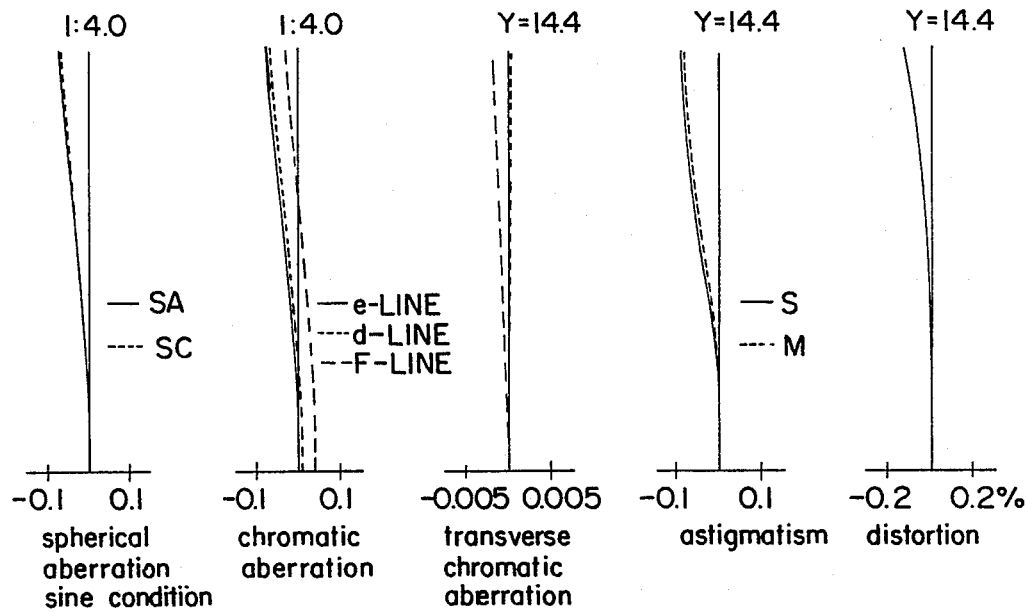

FIG. 9 shows a coma (e-line) of the imaging lens unit 20 as mentioned above at m=0.168× (design value). FIGS. 10A and 10B show comas (e line) at m=0.112× and m=0.224× respectively under the condition that the correcting lens group 22 is fixed with respect to the light receiving surface 12 and the main lens group 21 moves as shown in Table 2 mentioned above. As can be understood from the foregoing, the comas at m=0.112× and m=0.224× are almost identical to that at m=0.168×. FIGS. 11A and 11B show comas at m=0.112× and m=0.224× respectively when the correcting lens group 22 is moved together with the main lens group 21. This shows that almost no deterioration of the coma is caused in the present invention. Note that in this example, $f/f_F=0.055$ which satisfies the relationship given by $0 < f/f_F < 0.5$.

The following discussion will be directed to examples of focal length ratios of the main lens group 21 and the correcting lens group 22, with reference to Tables 3 through 9 and FIGS. 12A through 18A. In these examples, the main lens group 21 moves and the rear lens group 22 is fixed with respect to the light receiving surface 12. The main lens group 21 is a complex lens and the rear lens group 22 is a single lens. The basic arrangemnt of the embodiments shown in FIGS. 12 through 18 are substantially the same as that shown in FIG. 4, although the design values of the lens elements (e.g. radius of curvature, distance between lenses, refractive index etc.) in these embodiments are different from each other. Both the main lens group 21 and the correcting lens group 22 have positive focal lengths. The figures having an affix A after the number (e.g. FIG. 12A) show a lens construction. Similarly, affixes B, C and D represent aberrations at m=0.112×, 0.168× and 0.224 ×, respectively.

In Tables 3-9, focal lengths $f_B$ and $f_A$ of the front lens group 21 and the rear lens group 22, and the ratio $(f_B/f_A)$ are given. As can be understood from the Tables and drawings, with both the requirements of $2 < f_B/f_A < 8$ and $2.5 < f_B/f_A < 6$, a high imaging efficiency can be obtained in the total magnification range. Numeral 24 designates a cover glass plate located behind the correcting lens group 22. The radii of curvature $r_{14}$, $r_{15}$($r_{13}$, $r_{14}$ or $r_{12}$, $r_{13}$) are infinite ($\infty$).

In the following tables,
$r_i$: radius of curvature of No. i surface
$d_i$: distance between No. i surface and No. (i+1) surface
$n_i$: refractive index of e-line of No. i lens
$\nu_i$: Abbe's number of No. i lens
f: focal length (e-line) of the imaging lens group 20 as a whole
$l_A$: distance of the main lens group 21 from the object plane 11
$l_B$: distance of the correcting lens group 22 from the light eceiving surface 12,

TABLE 3
(FIG. 12A)

```
F   =  3.5   0.112x~0.168x~0.224x
f   =  39.41~40.14~40.89        f_A = 43.71
d₁₁ =  4.13~6.95~9.76           f_B = 140.40
l_A =  371.25~258.04~201.43     f_B/f_A = 3.21
l_B =  18.22 (constant)
```

| | | | | | |
|---|---|---|---|---|---|
| $r_1$ | 23.568 | $d_1$ | 4.50 | $n_1$ 1.79013 | $\nu_1$ 44.2 |
| $r_2$ | 59.931 | $d_2$ | 0.10 | | |
| $r_3$ | 13.451 | $d_3$ | 5.00 | $n_3$ 1.80401 | $\nu_3$ 42.2 |
| $r_4$ | 34.906 | $d_4$ | 1.10 | $n_3$ 1.81265 | $\nu_3$ 25.4 |
| $r_5$ | 8.758 | $d_5$ | 10.48 | | |
| $r_6$ | −9.118 | $d_6$ | 1.70 | $n_4$ 1.81265 | $\nu_4$ 25.4 |
| $r_7$ | −13.235 | $d_7$ | 0.20 | | |
| $r_8$ | −41.824 | $d_8$ | 3.44 | $n_5$ 1.69979 | $\nu_5$ 55.5 |
| $r_9$ | −14.074 | $d_9$ | 0.10 | | |
| $r_{10}$ | 50.021 | $d_{10}$ | 3.50 | $n_6$ 1.69979 | $\nu_6$ 55.5 |
| $r_{11}$ | 59.315 | $d_{11}$ | change | | |
| $r_{12}$ | 652.638 | $d_{12}$ | 2.50 | $n_7$ 1.71615 | $\nu_7$ 53.8 |
| $r_{13}$ | 118.664 | $d_{13}$ | 17.52 | | |
| | | $d_{14}$ | 0.70 | $n_8$ 1.51825 | $\nu_8$ 64.1 |

TABLE 4
(FIG. 13A)

```
F   =  4.0   0.112x~0.168x~0.224x
f   =  45.34~45.95~46.57        f_A = 50.34
d₁₁ =  1.74~4.95~8.16           f_B = 219.90
l_A =  427.45~295.97~230.22     f_B/f_A = 4.37
l_B =  29.64 (constant)
```

| | | | | | |
|---|---|---|---|---|---|
| $r_1$ | 24.789 | $d_1$ | 4.00 | $n_1$ 1.80922 | $\nu_1$ 39.6 |
| $r_2$ | 57.200 | $d_2$ | 0.10 | | |
| $r_3$ | 14.193 | $d_3$ | 4.50 | $n_3$ 1.80401 | $\nu_3$ 42.2 |
| $r_4$ | 29.360 | $d_4$ | 1.10 | $n_3$ 1.81265 | $\nu_3$ 25.4 |
| $r_5$ | 9.367 | $d_5$ | 13.01 | | |
| $r_6$ | −10.468 | $d_6$ | 1.70 | $n_4$ 1.81265 | $\nu_4$ 25.4 |
| $r_7$ | −15.141 | $d_7$ | 0.20 | | |
| $r_8$ | −24.217 | $d_8$ | 2.73 | $n_5$ 1.69979 | $\nu_5$ 55.5 |
| $r_9$ | −13.382 | $d_9$ | 0.10 | | |
| $r_{10}$ | 163.439 | $d_{10}$ | 1.91 | $n_6$ 1.69979 | $\nu_6$ 55.5 |
| $r_{11}$ | 163.439 | $d_{11}$ | change | | |
| $r_{12}$ | −92.147 | $d_{12}$ | 2.50 | $n_7$ 1.71615 | $\nu_7$ 53.8 |
| $r_{13}$ | −58.790 | $d_{13}$ | 28.94 | | |
| | | $d_{14}$ | 0.70 | $n_8$ 1.51825 | $\nu_8$ 64.1 |

TABLE 5
(FIG. 14A)

```
F   =  4.0   0.112x~0.168x~0.224x
f   =  45.17~45.81~46.48        f_A = 50.33
d₁₁ =  3.26~6.49~9.72           f_B = 206.07
l_A =  426.68~295.93~230.55     f_B/f_A = 4.09
l_B =  28.41 (constant)
```

| | | | | | |
|---|---|---|---|---|---|
| $r_1$ | 22.666 | $d_1$ | 3.50 | $n_1$ 1.80922 | $\nu_1$ 39.6 |
| $r_2$ | 51.957 | $d_2$ | 0.10 | | |
| $r_3$ | 14.695 | $d_3$ | 4.00 | $n_3$ 1.80401 | $\nu_3$ 42.2 |
| $r_4$ | 30.303 | $d_4$ | 1.80 | $n_3$ 1.81265 | $\nu_3$ 25.4 |
| $r_5$ | 9.228 | $d_5$ | 11.87 | | |
| $r_6$ | −9.817 | $d_6$ | 1.70 | $n_4$ 1.81265 | $\nu_4$ 25.4 |
| $r_7$ | −13.976 | $d_7$ | 0.20 | | |
| $r_8$ | −29.496 | $d_8$ | 3.00 | $n_5$ 1.65425 | $\nu_5$ 58.5 |
| $r_9$ | −13.291 | $d_9$ | 0.10 | | |

Figure 14A:
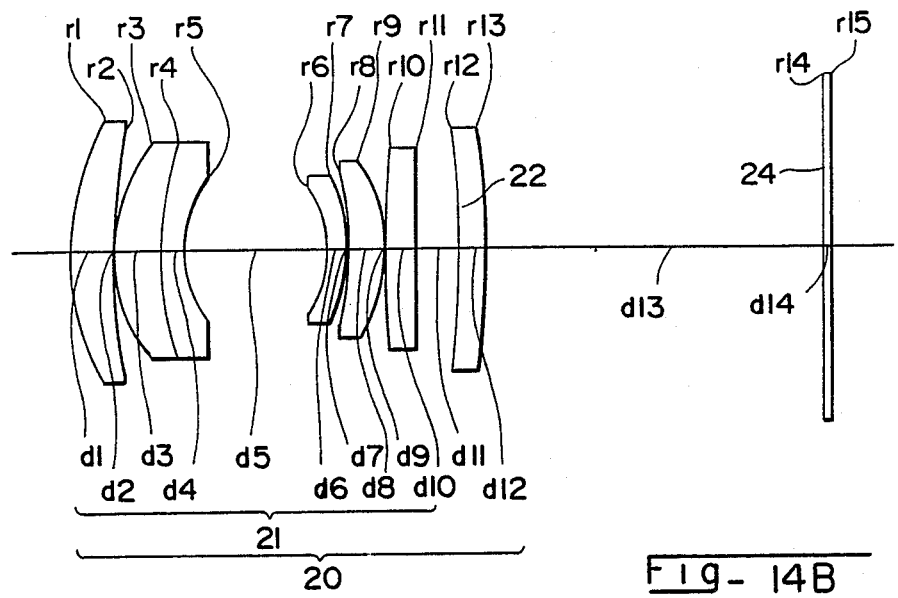
Figure 14B:
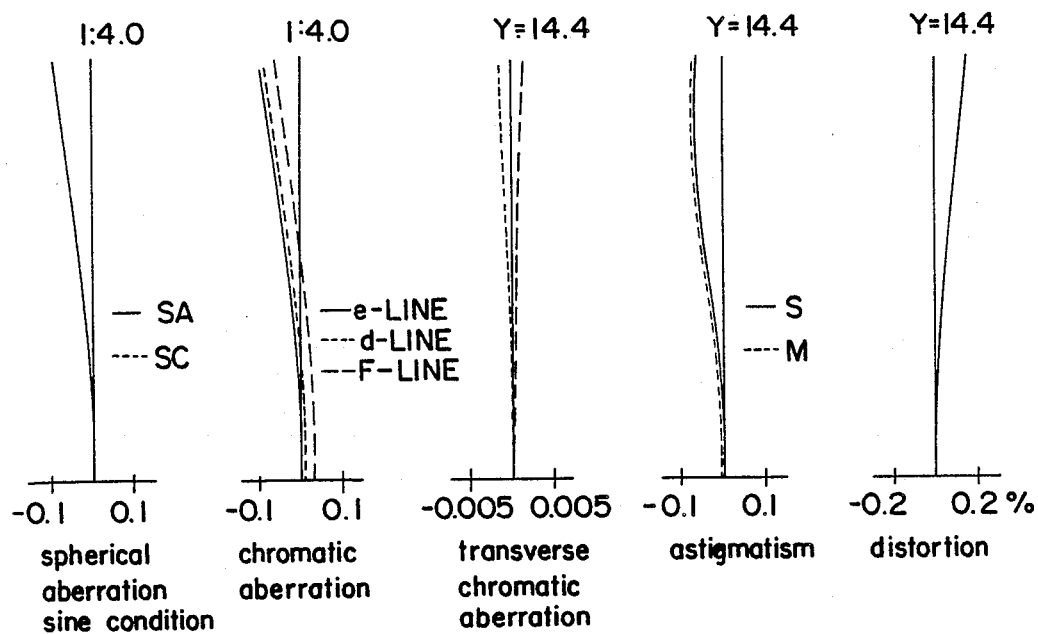
Figure 14C:
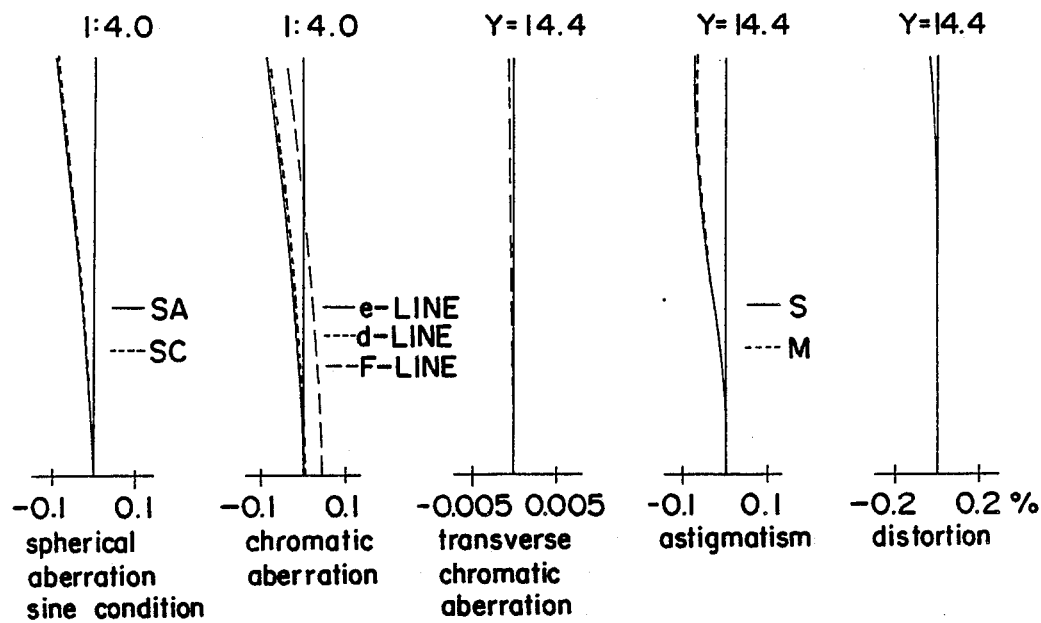
Figure 14D:
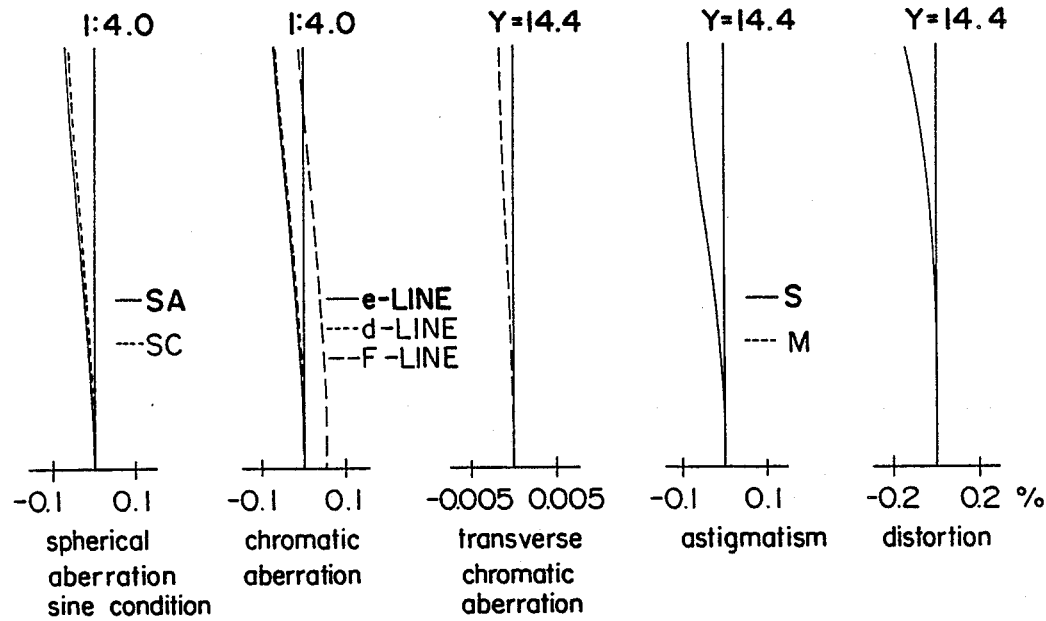
Figure 15A:
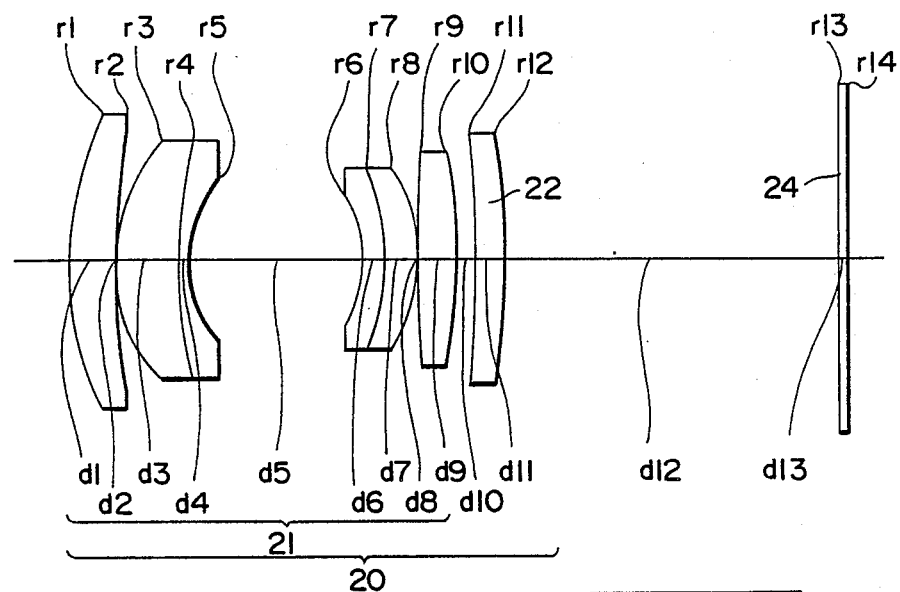
Figure 15B:
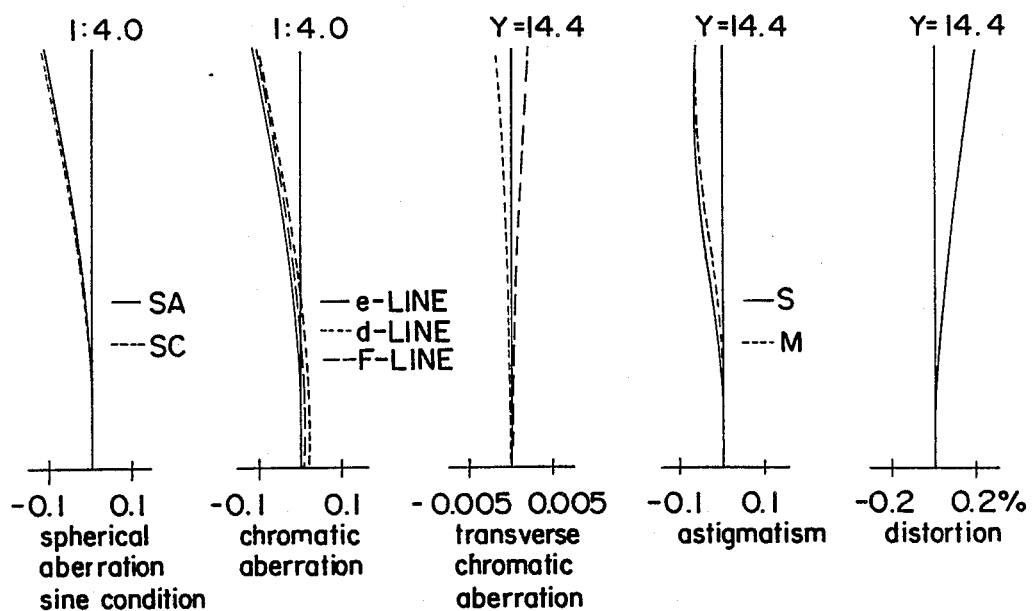
Figure 15C:
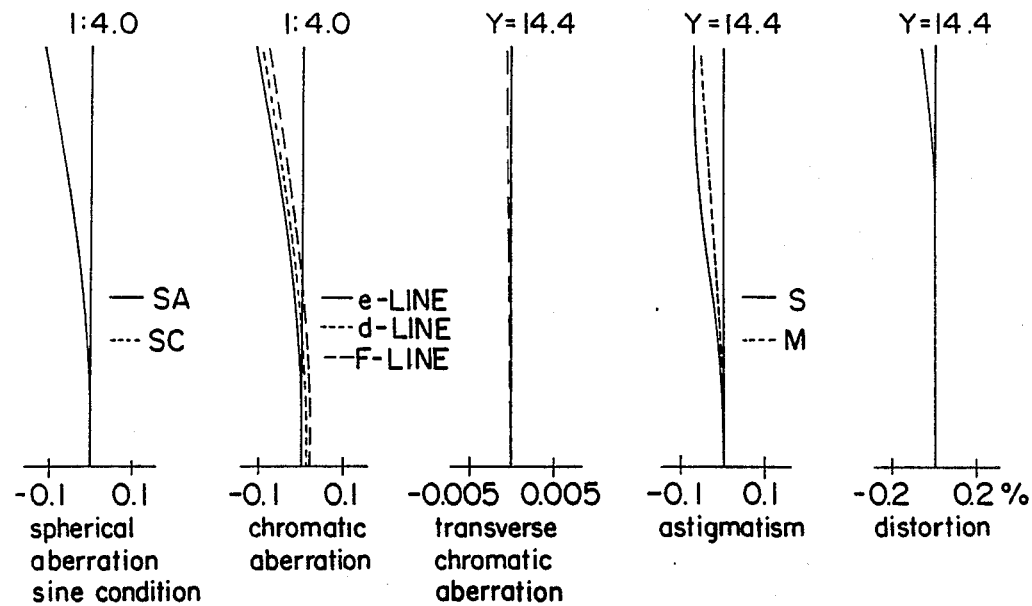
Figure 15D:
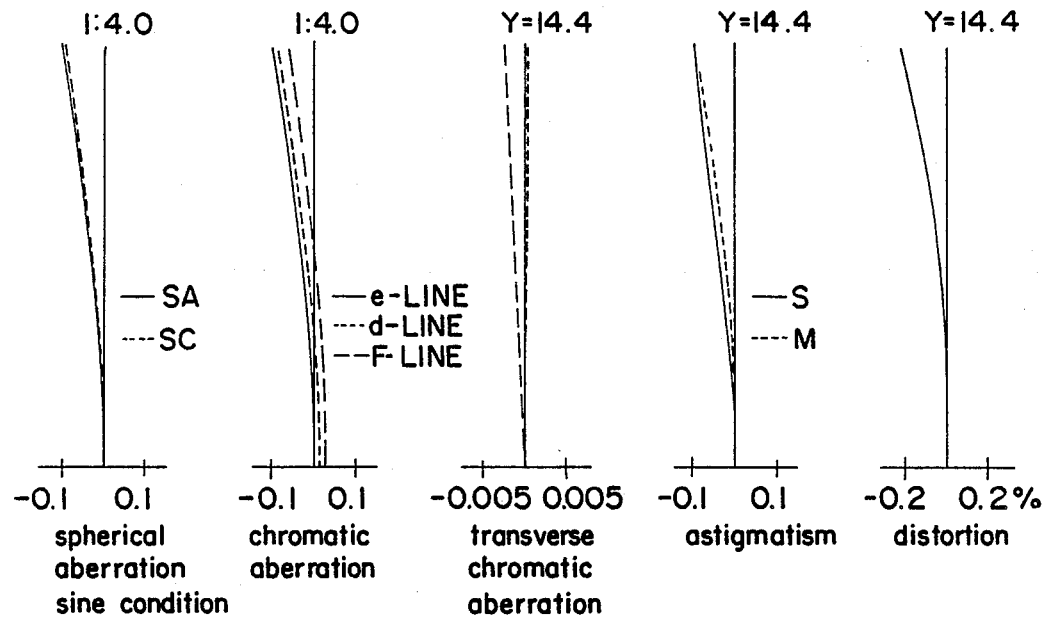
Figure 16A:
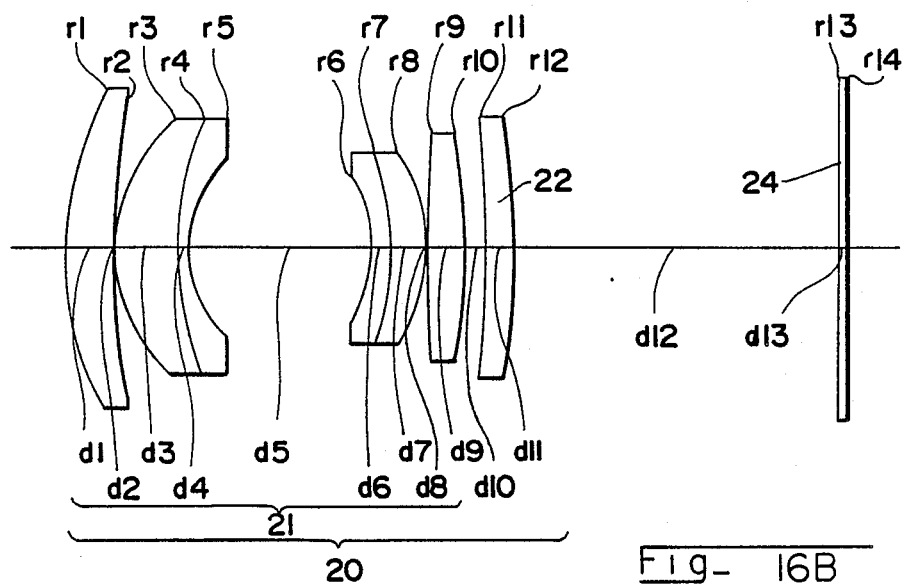
Figure 16B:
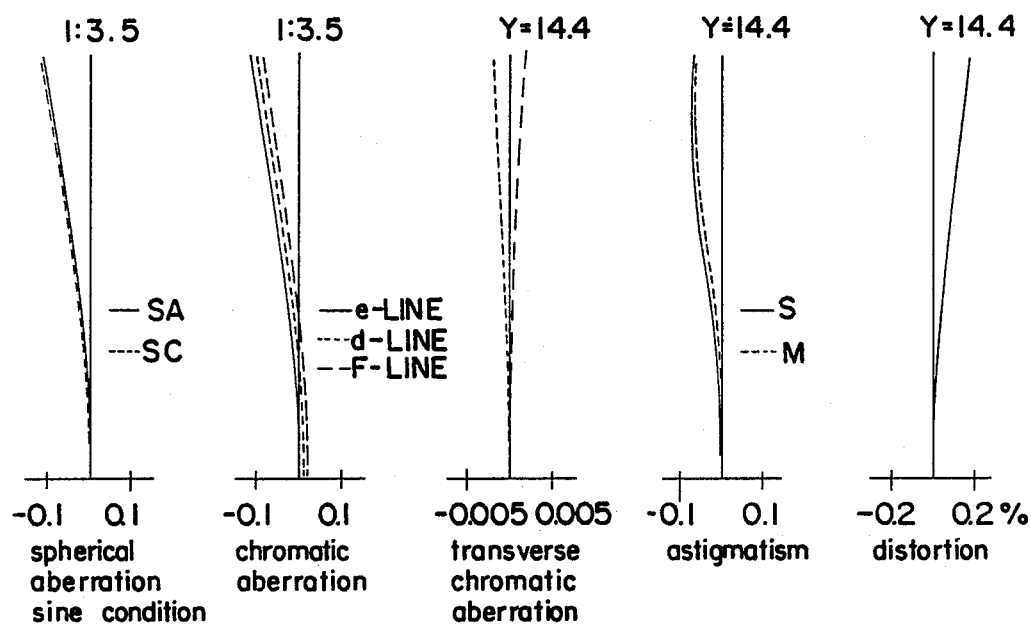
Figure 17A:
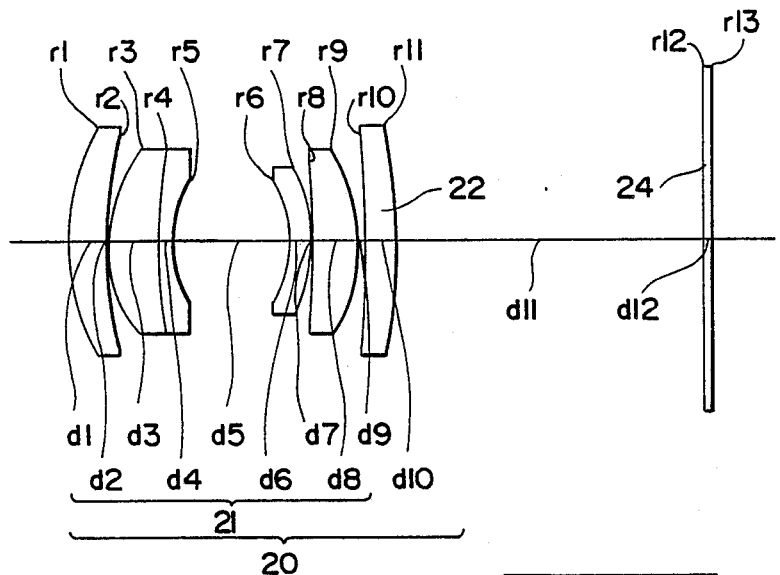
Figure 17B:
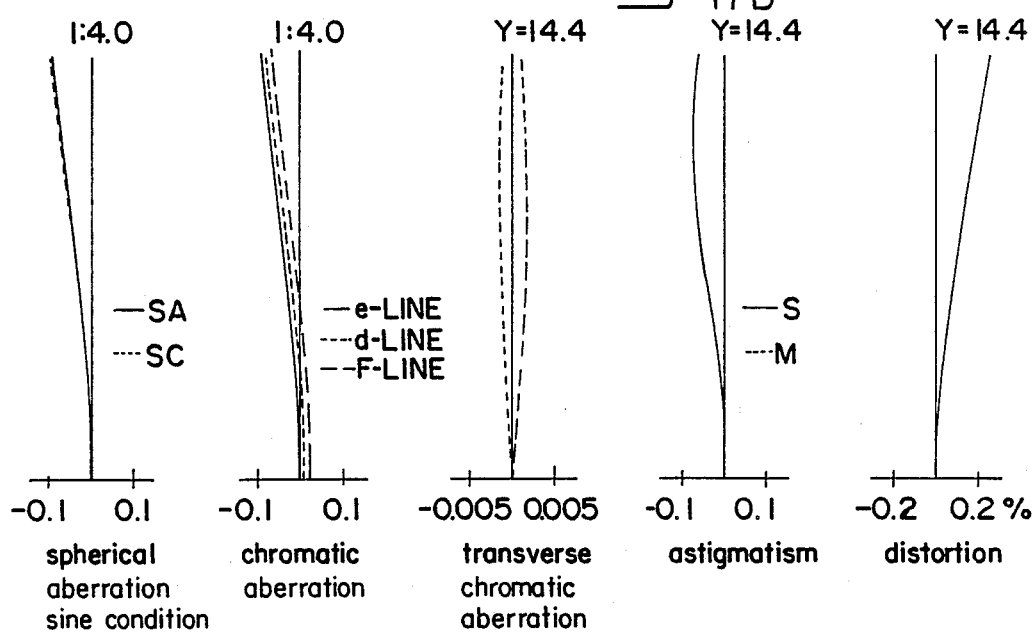
Figure 17C:
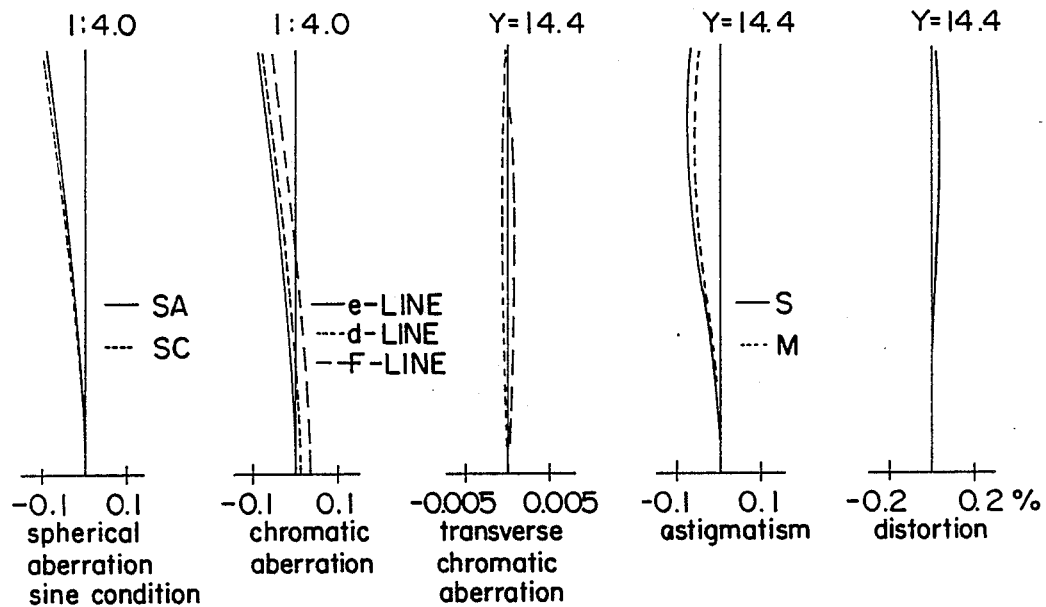
Figure 17D:
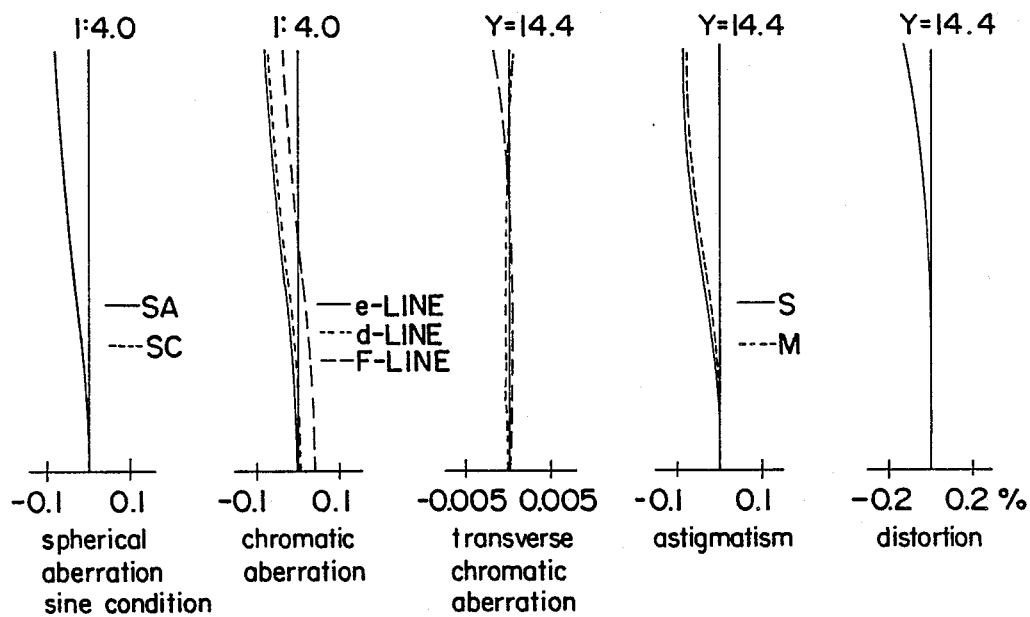

TABLE 5-continued (FIG. 14A)

| | | | | | | | |
|---|---|---|---|---|---|---|---|
| $r_{10}$ | 248.113 | $d_{10}$ | 2.59 | | $n_6$ 1.69979 | | $\nu_6$ 55.5 |
| $r_{11}$ | 248.113 | $d_{11}$ | change | | | | |
| $r_{12}$ | 109.358 | $d_{12}$ | 2.50 | | $n_7$ 1.71615 | | $\nu_7$ 53.8 |
| $r_{13}$ | −63.411 | $d_{13}$ | 27.71 | | | | |
| | | $d_{14}$ | 0.70 | | $n_8$ 1.51825 | | $\nu_8$ 64.1 |

TABLE 6

(FIG. 15A)

F = 4.0  0.112x~0.168x~0.224x
f = 45.74~46.42~47.12         $f_A = 51.06$
$d_{10}$ = 1.66~4.95~8.24         $f_B = 200.34$
$l_A$ = 427.64~295.41~229.29    $f_B/f_A = 3.92$
$l_B$ = 28.22 (constant)

| | | | | | |
|---|---|---|---|---|---|
| $r_1$ | 27.612 | $d_1$ | 4.00 | $n_1$ 1.80922 | $\nu_1$ 39.6 |
| $r_2$ | 71.393 | $d_2$ | 0.10 | | |
| $r_3$ | 15.384 | $d_3$ | 5.00 | $n_3$ 1.80401 | $\nu_3$ 42.2 |
| $r_4$ | 37.820 | $d_4$ | 1.10 | $n_3$ 1.81265 | $\nu_3$ 25.4 |
| $r_5$ | 10.489 | $d_5$ | 14.27 | | |
| $r_6$ | −11.442 | $d_6$ | 1.70 | $n_4$ 1.79192 | $\nu_4$ 25.7 |
| $r_7$ | −20.434 | $d_7$ | 2.90 | $n_5$ 1.79013 | $\nu_5$ 44.2 |
| $r_8$ | −13.752 | $d_8$ | 0.10 | | |
| $r_9$ | 219.085 | $d_9$ | 3.00 | $n_6$ 1.69979 | $\nu_6$ 55.5 |
| $r_{10}$ | −52.528 | $d_{10}$ | change | | |
| $r_{11}$ | 106.412 | $d_{11}$ | 2.50 | $n_7$ 1.71615 | $\nu_7$ 53.8 |
| $r_{12}$ | −61.696 | $d_{12}$ | 27.52 | | |
| | | $d_{13}$ | 0.70 | $n_8$ 1.51825 | $\nu_8$ 64.1 |

TABLE 7

(FIG. 16A)

F = 3.5  0.112x~0.168x~0.224x
f = 45.93~46.70~47.49         $f_A = 51.79$
$d_{10}$ = 1.58~4.96~8.34         $f_B = 181.98$
$l_A$ = 427.67~295.33~229.16    $f_B/f_A = 3.51$
$l_B$ = 27.39 (constant)

| | | | | | |
|---|---|---|---|---|---|
| $r_1$ | 28.374 | $d_1$ | 4.00 | $n_1$ 1.80811 | $\nu_1$ 46.6 |
| $r_2$ | 73.811 | $d_2$ | 0.10 | | |
| $r_3$ | 14.752 | $d_3$ | 5.00 | $n_3$ 1.80401 | $\nu_3$ 42.2 |
| $r_4$ | 26.370 | $d_4$ | 1.10 | $n_3$ 1.81265 | $\nu_3$ 25.4 |
| $r_5$ | 10.124 | $d_5$ | 15.18 | | |
| $r_6$ | −11.461 | $d_6$ | 1.70 | $n_4$ 1.79192 | $\nu_4$ 25.7 |
| $r_7$ | −21.598 | $d_7$ | 2.90 | $n_5$ 1.79013 | $\nu_5$ 44.2 |
| $r_8$ | −13.750 | $d_8$ | 0.10 | | |
| $r_9$ | 224.867 | $d_9$ | 3.00 | $n_6$ 1.68082 | $\nu_6$ 55.3 |
| $r_{10}$ | −51.182 | $d_{10}$ | change | | |
| $r_{11}$ | 131.944 | $d_{11}$ | 2.50 | $n_7$ 1.69979 | $\nu_7$ 55.5 |
| $r_{12}$ | −65.309 | $d_{12}$ | 26.69 | | |
| | | $d_{13}$ | 0.70 | $n_8$ 1.51825 | $\nu_8$ 64.1 |

TABLE 8

(FIG. 17A)

F = 4.0  0.112x~0.168x~0.224x
f = 39.46~39.98~40.53          $f_A = 43.80$
$d_9$ = 0.79~3.58~6.38            $f_B = 190.13$
$l_A$ = 375.40~261.01~203.81    $f_B/f_A = 4.34$
$l_B$ = 25.98 (constant)

| | | | | | |
|---|---|---|---|---|---|
| $r_1$ | 19.717 | $d_1$ | 3.30 | $n_1$ 1.80922 | $\nu_1$ 39.6 |
| $r_2$ | 44.584 | $d_2$ | 0.10 | | |
| $r_3$ | 13.021 | $d_3$ | 4.00 | $n_3$ 1.80401 | $\nu_3$ 42.2 |
| $r_4$ | 35.487 | $d_4$ | 1.10 | $n_3$ 1.81265 | $\nu_3$ 25.4 |
| $r_5$ | 8.492 | $d_5$ | 9.97 | | |
| $r_6$ | −9.272 | $d_6$ | 1.70 | $n_4$ 1.81265 | $\nu_4$ 25.4 |
| $r_7$ | −13.237 | $d_7$ | 0.20 | | |
| $r_8$ | −51.595 | $d_8$ | 3.57 | $n_5$ 1.73234 | $\nu_5$ 54.7 |
| $r_9$ | −15.129 | $d_9$ | change | | |
| $r_{10}$ | −80.319 | $d_{10}$ | 2.50 | $n_6$ 1.71615 | $\nu_6$ 53.8 |
| $r_{11}$ | −51.176 | $d_{11}$ | 25.28 | | |
| | | $d_{12}$ | 0.70 | $n_7$ 1.51825 | $\nu_7$ 64.1 |

TABLE 9

(FIG. 18A)

F = 4.0  0.112x~0.168x~0.224x

Figure 18A:
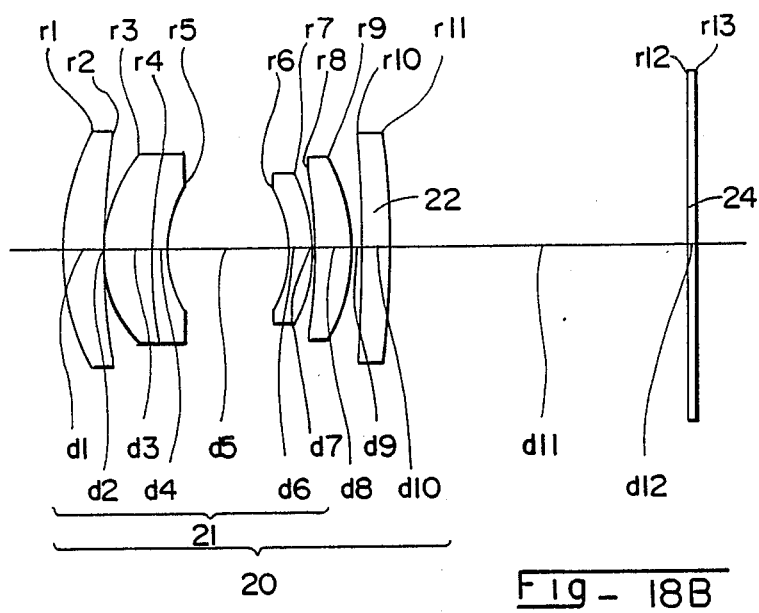
Figure 18B:
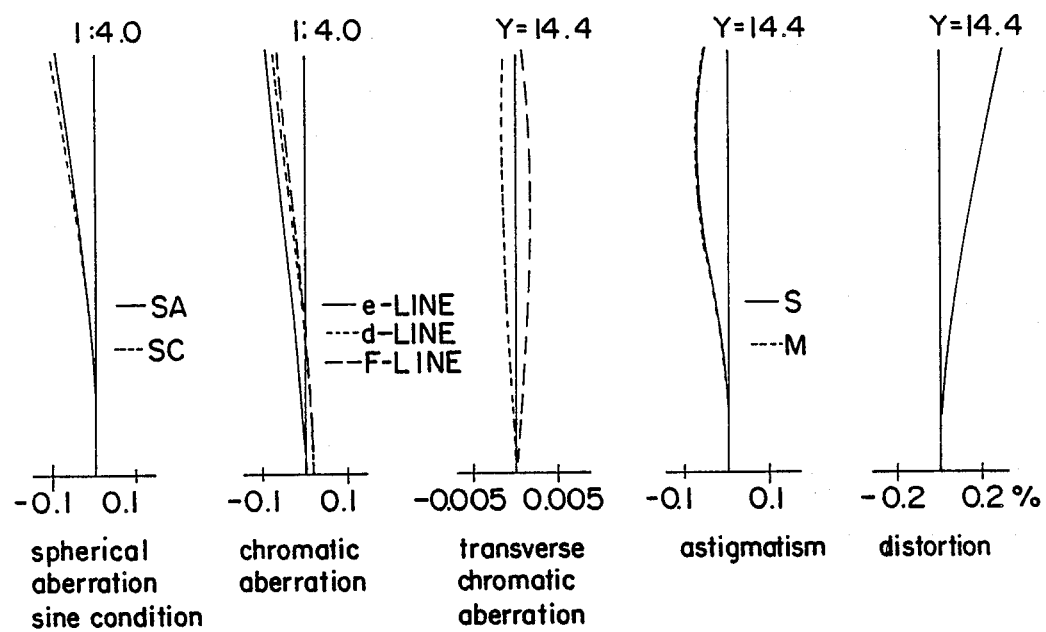
Figure 18C:
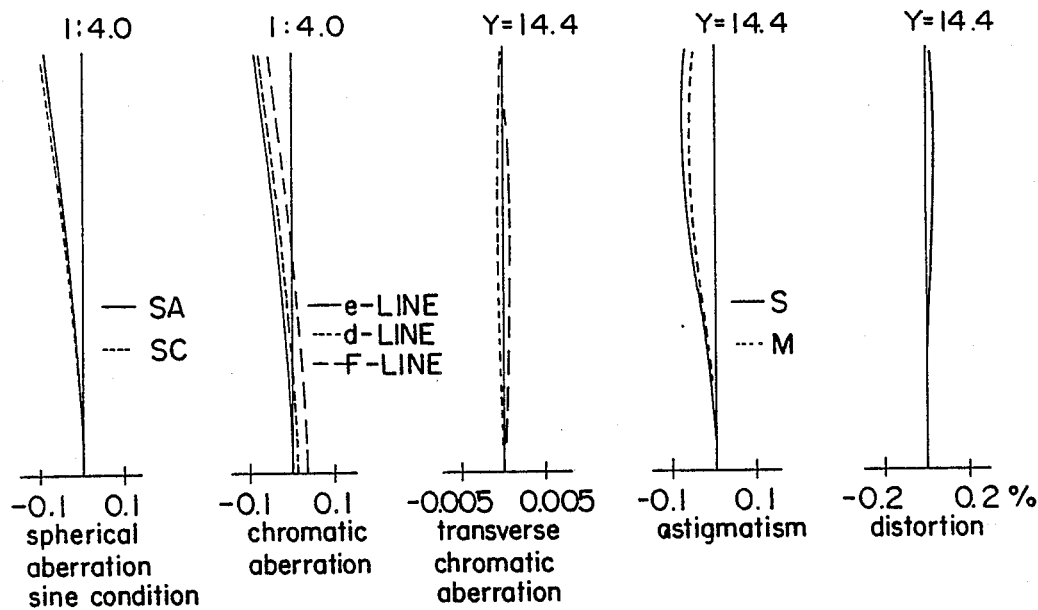
Figure 18D:
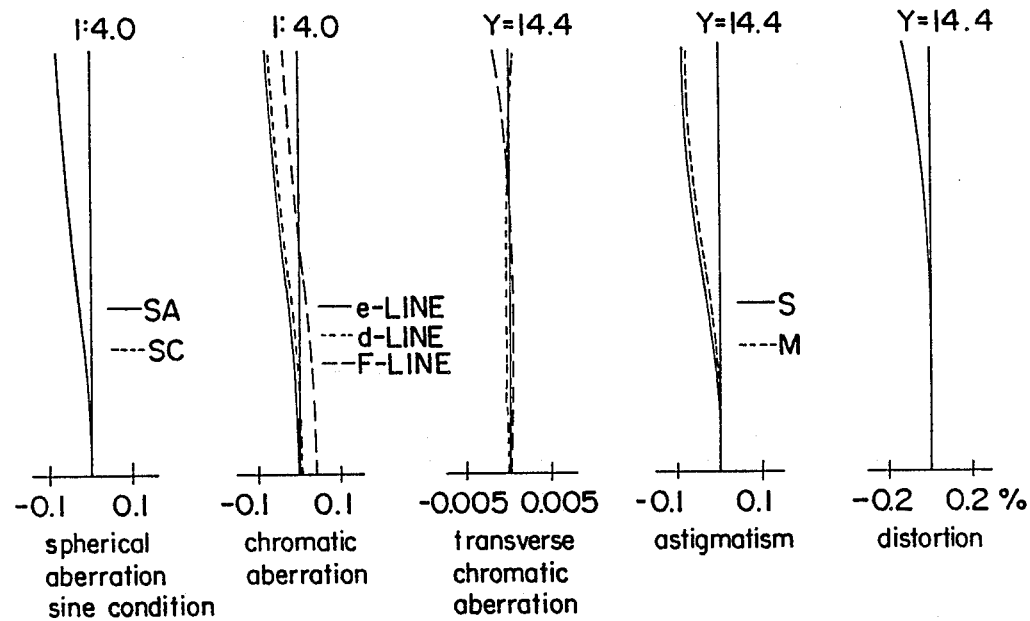

TABLE 9-continued (FIG. 18A)

f = 39.50~40.02~40.55          $f_A = 43.71$
$d_9$ = 0.83~3.60~6.38            $f_B = 193.63$
$l_A$ = 376.85~262.27~204.98    $f_B/f_A = 4.43$
$l_B$ = 25.08 (constant)

| | | | | | |
|---|---|---|---|---|---|
| $r_1$ | 21.120 | $d_1$ | 3.30 | $n_1$ 1.80401 | $\nu_1$ 42.2 |
| $r_2$ | 47.768 | $d_2$ | 0.10 | | |
| $r_3$ | 12.298 | $d_3$ | 4.00 | $n_3$ 1.79013 | $\nu_3$ 44.2 |
| $r_4$ | 27.536 | $d_4$ | 1.10 | $n_3$ 1.79192 | $\nu_3$ 25.7 |
| $r_5$ | 8.301 | $d_5$ | 10.35 | | |
| $r_6$ | −9.781 | $d_6$ | 1.70 | $n_4$ 1.81265 | $\nu_4$ 25.4 |
| $r_7$ | −14.596 | $d_7$ | 0.20 | | |
| $r_8$ | −51.466 | $d_8$ | 3.16 | $n_5$ 1.77620 | $\nu_5$ 49.6 |
| $r_9$ | −15.429 | $d_9$ | change | | |
| $r_{10}$ | 104.497 | $d_{10}$ | 2.50 | $n_6$ 1.60548 | $\nu_6$ 60.7 |
| $r_{11}$ | −55.749 | $d_{11}$ | 24.38 | | |
| | | $d_{12}$ | 0.70 | $n_7$ 1.51825 | $\nu_7$ 64.1 |

Figure 20:
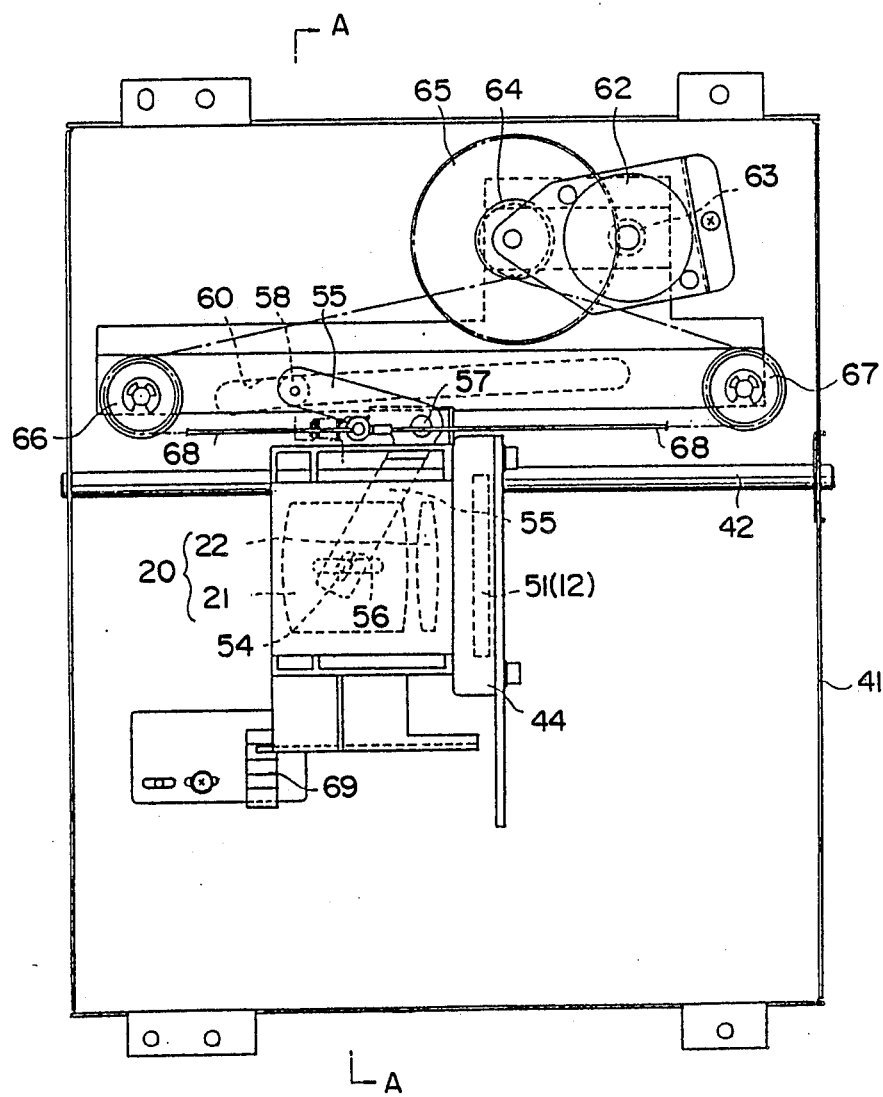
FIG. 20 is a plan view of a movable base shown in FIG. 19.
Figure 21:
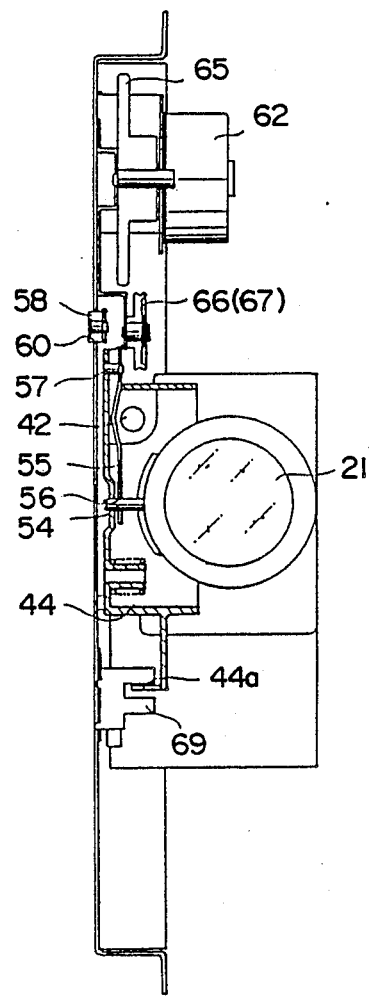
FIG. 21 is a sectional view taken along the line A—A in FIG. 20.

FIGS. 19 through 21 show an embodiment of a magnification varying device according to the present invention. A stationary base (immovable base) 41 is provided below a glass plate 40 (object plane 11) for a document. The stationary base 41 has a guide bar 42 secured thereto which extends in a parallel direction with the glass plate 40. The guide bar 42 slidably supports a movable base 44 which carries the imaging lens unit 20 having the main lens group 21 and the correcting lens group 22. The correcting lens group 22 is secured to a stationary lens barrel 48 integral with the movable base 44. The main lens group 21 is secured to a slide lens barrel 50 which is slidably fitted in the stationary lens barrel 48. A CCD 51 is secured to the movable base 48 which is located behind the correcting lens group 22 and which serves as the light receiving surface 12.

A slide lens barrel 50 is provided on its lower portion with a drive pin 54 projecting therefrom, which is fitted in an association hole 56 formed in an end of a cam lever 55. The cam lever 55 is pivoted to the movable base 44 through a shaft 57. The cam lever 55 has at its opposite end a cam follower 58 pivoted thereto. The cam follower 58 is engaged in a cam groove 60, which is formed in the stationary base 41. The cam groove 60 extends along the guide bar 42, so that the main lens group 21 moves relative to the correcting lens group 22 (CCD 51), for example, in a relationship to the correcting lens group 22, as shown in FIG. 1.

On the stationary base 41 is provided a pulse motor 62 which has an output shaft 63 in mesh with a gear 65 coaxial to and integral with a main pulley 64. On the stationary base 41 are provided a pair of pulleys 66 and 67, located at the opposite ends of the guide bar 42, so that a wire 68, which is wound around the main pulley 64 and the pulleys 66, 67 without a slip, is connected at the opposite ends of the wire 68 to the movable base 44.

Below the glass plate 44 is an illumination scanning optical system 70, which scans document 0 (object) on the glass plate 40, so that the light reflected by the document is incident upon the imaging lens unit 20. The illumination scanning optical system 70 has a first carriage 71 and a second carriage 72. The speed ratio of movement of the first carriage 71 and the second carriage 72 is approximately 2:1. The first carriage 71 has an illuminating light source 73 and a first mirror 74 which reflects the illumination light reflected by the document 0 into a direction parallel with the object plane (document). The second carriage 72 has a second mirror 75a and a third mirror 75b for reflecting the light reflected by the first mirror 74 into the opposite direction to be incident upon the imaging lens unit 20. Numeral 69 in FIGS. 20 and 21 designates a photointerrupter which detects and controls the initial position of the movable base 44 in association with a detecting dog (leg) 44a of the movable base 44.

In the above-mentioned apparatus, the magnification can be changed by moving the movable base 44, which is driven by the pulse motor 62. When the movable base 44 moves, the object-image distance is varied to change the magnification in such a way that the object plane 11 is immovable and the light receiving surface 12 is movable, contrary to the relationship shown in FIG. 1. When the movable base 44 moves, the cam lever 55, which is pivoted to the movable base 44 through the shaft 57 is also moved, so that the cam lever 55 rotates about the shaft 57 by a predetermined angular displacement by the engagement of the cam follower 58 in the cam groove 60. The rotational displacement of the cam lever 55 causes the main lens group 21 to move relative to the correcting lens group 22 through the association hole 56 and the drive pin 54 engaged therein, so that a decrease of imaging efficiency, which would otherwise occur due to the change of magnification, can be prevented.

When scanning by the illumination scanning optical system 70, is effected at each magnification, the first carriage 71 moves to positions 71' and 71" as shown in FIG. 19. At the same time, the second carriage 72, moves to positions 72' and 72" as shown in FIG. 19 to focus the light reflected by the document 0 onto the CCD 51 through the imaging lens unit 20 to form an image. The speed ratio of approximately 2:1 between the first carriage 71 and the second carriage 72 contributes to a constant optical path length between the document 0 and the CCD 51, as is well known.

FIGS. 22 through 26 show another embodiment. In this modified embodiment, the object-image distance is changed by the illumination scanning optical system 70A, while keeping the glass plate 40 and the CCD 51 at a fixed positional relationship therebetween. In FIG. 22, supposing that the initial position of the second carriage 72 of the illumination scanning optical system 70A is adjustable relative to the first carriage 71, namely, supposing that the second carriage 72 can change its position as shown at 72A, 72B relative to the first carriage 71, so that the carriages 71 and 72 run at a speed ratio of approximately 2:1 below the lower surface of the glass plate 40 in a positional relationship between the carriages after the adjustment, the optical distance between the glass plate 40 and the CCD 51, i.e., the object-image distance is changed. The embodiment illustrated in FIGS. 22-26 has been created based on this concept.

The following discussion will be directed to how to adjust the initial positional relationship between the first carriage 71 and the second carriage 72, particularly with reference to FIGS. 23 and 24.

The first carriage 71 and the second carriage 72 are movably supported by the guide bars 96 and 97 below the lower surface of the glass plate 40. Pulley shafts 76 and 77, which have small pulleys 78 and 79 and large pulleys 80 and 81 connected thereto are provided in the vicinity of the opposite ends of the guide bar 96. The ratio of diameters of the small and large pulleys is approximately 1:2. One of the pulley shafts 76 and 77, e.g. the pulley shaft 77, is rotated by the pulse motor 82 through a pinion 83 that is connected to the pulse motor 82, and a gear 84 that is integral with a pulley shaft 77 and engages with the pinion 83. A clutch mechanism 85 is provided between the large pulley 81 and the associated small pulley 79.

The second carriage 72 is secured to an endless wire 86 which is wound around the large pulleys 80 and 81 by means of a mounting 87. The first carriage 71 is secured to an endless wire 88 which is wound around the small pulleys 78 and 79 by means of a mounting 89.

Thus, when the clutch 85 is released (OFF), the pulse motor 82 is driven to move only the second carriage 72. The initial positional relationship between the first carriage 71 and the second carriage 72 can be adjusted, so that the optical distance between the glass plate 40 (object plane 11) and the CCD 51 (light receiving surface 12) can be adjusted in accordance with the magnification, without moving the glass plate 40 and the CCD 51, as shown in FIG. 1. When the clutch 85 is in an operative (ON) position, the pulse motor 82 is driven so that the first carriage 71 and the second carriage 72 can be moved at a speed ratio of 2:1.

A mechanism for supporting and adjusting the imaging lens group 20 on the stationary base 41 will be explained below with reference to FIGS. 22, 25 and 26. On the stationary base 41 is secured a stationary lens barrel 48 to which the correcting lens group 22 is secured. The CCD 51 is secured to the lens barrel 48 behind the correcting lens group 22. The slide lens barrel 50, which supports the main lens group 21 thereon, is slidably fitted in the stationary lens barrel 48. The above-mentioned construction is the same as that shown in FIGS. 19-21.

A rack 90 is secured to the lower surface of the slide lens barrel 50, which is engaged by a pinion 91 of a drive shaft 92 which is rotatably supported by the stationary base 41. The drive shaft 92 is rotated by the pulse motor 93 through an output pinion 94 of the pulse motor and a gear train 95 that is connected to the pinion 94. Accordingly, when the pulse motor 93 is controlled to set a desired distance between the main lens group 21 and the correcting lens group 22 in accordance with a desired magnification, i.e., the adjustment of the initial positional relationship between the first carriage 71 and the second carriage 72 by the illumination scanning optical system 70A, as mentioned above, the change of magnification for changing the object-image distance can be effected without moving the glass plate 40 and the CCD 51. No deterioration of the imaging property, which would otherwise occur due to the change of magnification occurs. The control mentioned above can be easily performed by detecting in advance a relationship between the initial positions of the first and second carriages 71 and 72 and the drive pulses to be supplied to the pulse motor 93.

Figure 25:
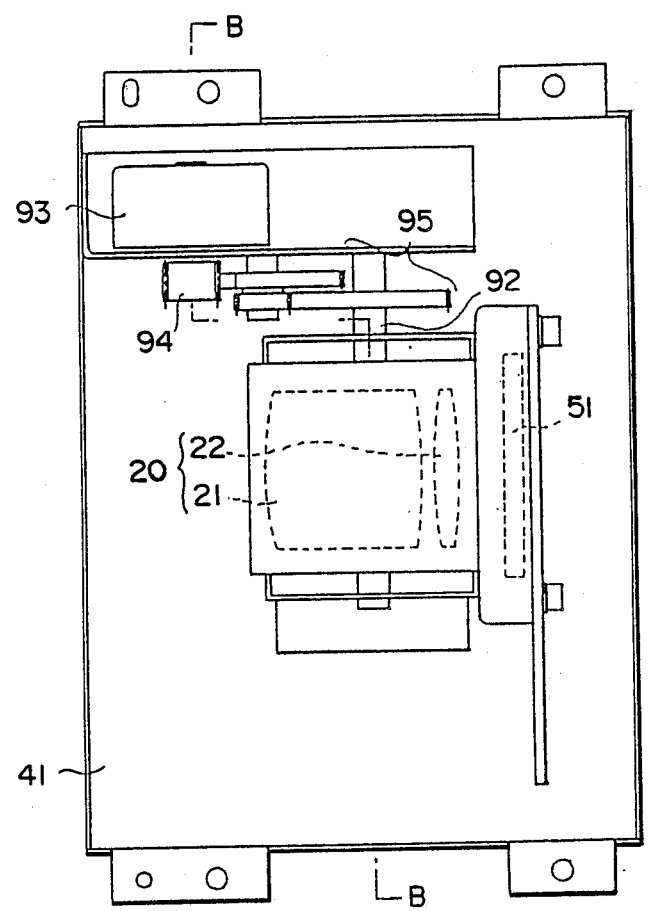
FIG. 25 is a plan view of a stationary base portion shown in FIG. 22.
Figure 26:
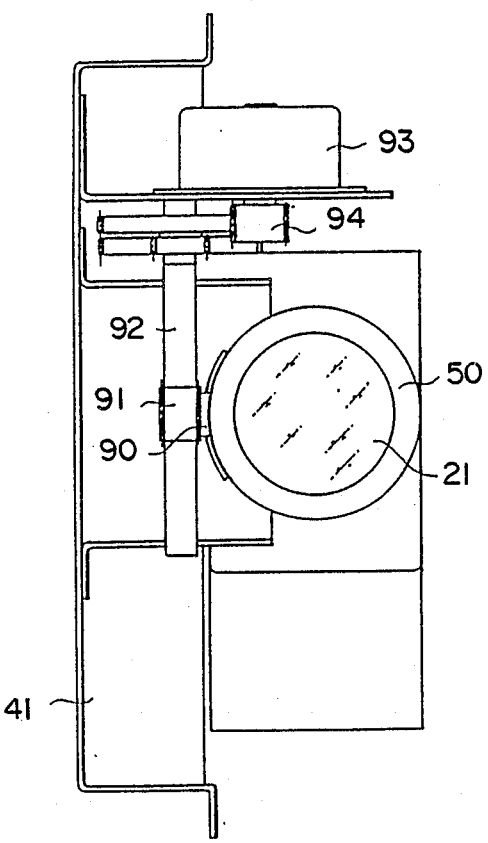
FIG. 26 is a sectional view taken along the line B—B in FIG. 25.
Figure 27:
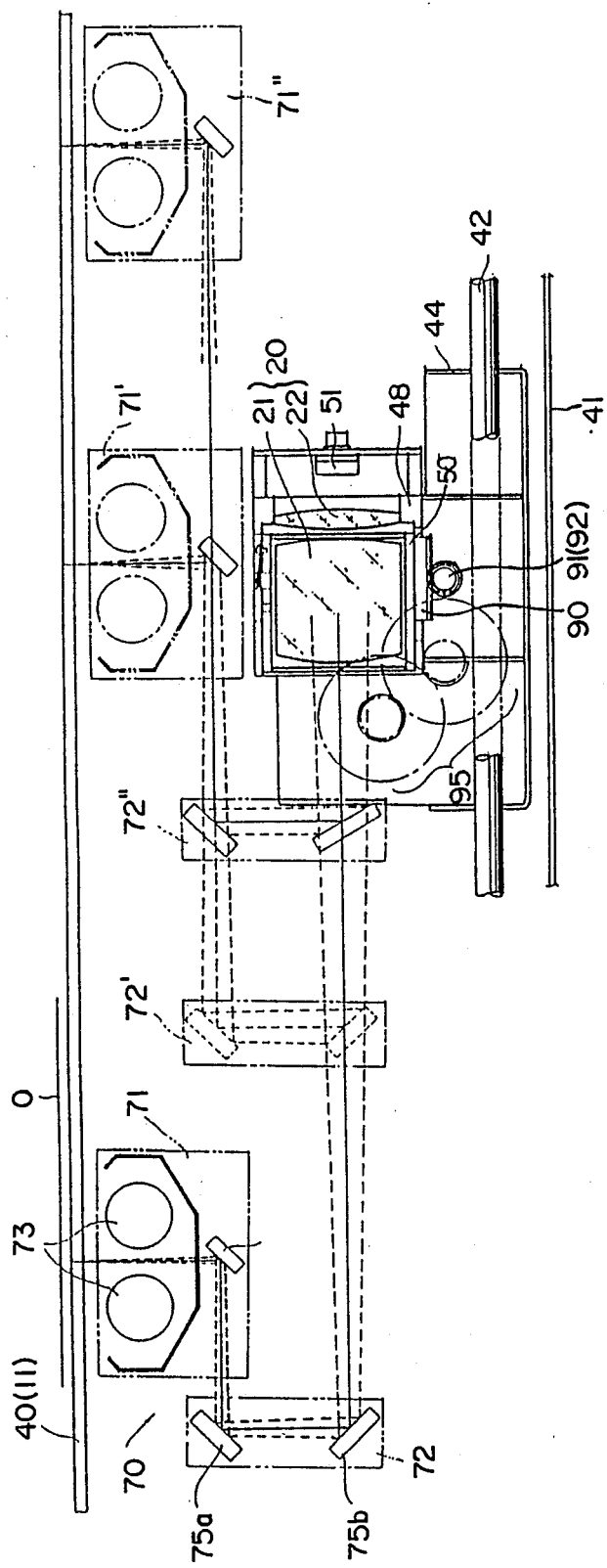
FIG. 27 is a front elevational view of a magnification varying device according to another aspect of the present invention.

It should be appreciated that the mechanism for moving the main lens group 211 illustrated in the embodiment shown in FIGS. 22 to 26, can be replaced with the mechanism having the cam lever 55 and the cam groove 60, etc. for moving the main lens group 21 shown in FIGS. 19 through 21 mentioned above. The replacement is shown in FIG. 27 by way of an example. In FIG. 27, the elements which are supported on the stationary base 41 shown in FIGS. 22, 25 and 26 are provided on the movable base 44' which is movably supported by the guide bar 42 on the stationary base 41. The movement control of the movable base 44' can be effected in a similar way to that of the above-mentioned embodiment illustrated in FIGS. 19 through 21. In FIG. 27, the elements corresponding to those in the above-mentioned embodiments are designated with the same reference numerals.

As can be understood from the foregoing, according to the present invention, since the imaging lens unit is composed of the main lens group and the correcting lens group which are relatively movable, one of which is fixed with respect to the light receiving surface and the other being movable in accordance with the magnification, the decrease in imaging efficiency, due to the change of magnification can be prevented, as compared to the conventional magnification varying optical device in which the imaging lens unit is wholly moved.

Furthermore, according to the present invention, since one of the main lens group and the correcting lens group is fixed with respect to the light receiving surface, the mechanism for moving the imaging lens unit can be simplified, thus resulting in a realization of a small, inexpensive and high quality optical device for varying the magnification.

According to an arrangement of the present invention, in which one of the main lens group and the correcting lens group (auxiliary lens group), and the light receiving surface are secured to the movable base, the other lens group being movable in the optical axis direction on the movable base, and wherein the apparatus comprises a variable power means for moving the movable base in the optical axis direction upon changing the magnification to change the distance between the movable base and a fixed object plane, and correcting means for moving the movable main lens group or correcting lens group to a desired position on the movable base, the position control of the main lens group and the correcting lens group can be easily effected by the control of the movement of the movable base.

According to an arrangement of the present invention, since the position of the movable lens group on the movable base is controlled by the cam groove formed on the stationary base when the movable base is driven by the pulse motor, the position of the movable lens group can be controlled by the control of the movement of the movable base.

It is also possible to control the movement of the movable lens group on the movable base by a pulse motor that is different from the pulse motor for moving the movable base. In this alternative, a more precise position control of the movable lens can be expected.

According to an arrangement of the present invention, the object-image distance can be controlled without moving the object plane and the light receiving surface by the control of the initial position of the first and second carriages of the scanning means for scanning the object, and accordingly, in addition to the adjusting mechanism of the position of the movable lens group on the stationary base, the change of magnification by the change of the object-image distance can be effected by a separate mechanism, while preventing the deterioration of imaging property. Accordingly, the invention can be applied to an apparatus in which the object plane and the light receiving surface are immovable. The object-image distance varying means can be easily realized by a pair of coaxial pulleys which are connected to each other by an endless wire wound around the first and second carriages and which has a diameter ratio of approximately 1:2, and a clutch means provided between the pulleys.

We claim:

1. A magnification varying optical device, said device comprising and object plane on which an object is to be located, a light receiving surface, and an imaging lens for focusing an image of said object located on said object plane onto said light receiving surface, so that upon varying said magnification of said optical device, an optical distance between said object plane and said light receiving surface can be changed, wherein said imaging lens comprises a main lens group and a correcting lens group that are movable relative to each other, one of said main lens group and said correcting lens group being fixed with respect to said light receiving surface, the other lens group being movable with respect to said object plane and the light receiving surface so as to vary said magnification.

2. A magnification varying optical device according to claim 1, wherein said optical device is an image reading device.

3. A magnification varying optical device according to claim 1, wherein said correcting lens group is a rear lens group which is fixed with respect to said light receiving surface, said main lens group is a movable front lens group.

4. A magnification varying optical device according to claim 3, wherein said main lens group moves toward said object as said magnification increases.

5. A magnification varying optical device according to claim 3, wherein said main lens unit includes a first lens group made of a positive meniscus lens with a convex surface located adjacent to said object, a second lens unit made of a negative meniscus lens with a convex surface located adjacent to said object, a third lens unit which includes at least a negative meniscus lens with a concave surface adjacent to said object, and a fourth lens unit made of a positive lens, said first, second, third and fourth lens units being located successively further away, as viewed from said object.

6. A magnification varying optical device according to claim 5, wherein said main lens group moves toward the object as said magnification increases.

7. A magnification varying optical device according to claim 3, wherein said correcting lens group comprises a positive lens which has a convex surface having a small radius of curvature that is located adjacent to said image plane.

8. A magnification varying optical device according to claim 7, wherein said main lens group moves toward the object as said magnification increases.

9. A magnification varying device according to claim 3, said main lens unit comprising a first lens group comprising a positive lens, a second lens unit comprising a negative lens with opposed concave surfaces, and a third lens unit comprising a positive lens, said first, second and third lens units being located successively further away, as viewed from said object.

10. A magnification varying optical device according to claim 9, wherein said main lens group moves toward said object as said magnification increases.

11. A magnification varying device according to claim 3, said correcting lens group comprising a positive lens which has a surface having a small radius of convex curvature that is located adjacent to said object.

12. A magnification varying optical device according to claim 8, wherein said main lens group moves toward said object as said magnification increases.

13. A magnification varying optical device according to claim 1, wherein the ratio of the focal lengths of the said correcting lens group and said imaging lens satisfies the relationship:

$0 < f/f_F < 0.5$ wherein f is said focal length of said imaging lens as a whole and $f_F$ is said focal length of said correcting lens group.

14. A magnification varying optical device according to claim 1, wherein said main lens group and said correcting lens group have positive refractive indexes.

15. A magnification varying optical device according to claim 14, wherein the ratio of the focal lengths of said main lens group and said correcting lens group satisfies the relationship:

$2 < f_B/f_A < 8$ wherein $f_B$ is said focal length of said main lens group and $f_A$ is said focal length of said correcting lens group.

16. A magnification varying optical device according to claim 14, wherein the ratio of the focal lengths of said main lens group and said correcting lens group satisfies the relationship:

$2.5 < f_B/f_A < 6$ wherein $f_B$ is said focal length of said main lens group and $f_A$ is said focal length of said correcting lens group.

17. A magnification varying optical device according to claim 1, wherein said main lens group is a front lens group which is fixed with respect to said light receiving surface, and said correcting lens group is a movable rear lens group.

18. A magnification varying optical device according to claim 17, wherein said correcting lens group moves towards said light receiving surface as said magnification increases.

19. A magnification varying optical device according to claim 1, further comprising a movable base to which one of said main lens group and said correcting lens group, and said light receiving surface, are secured, said remaining lens group being supported on said movable base so as to move in the optical axis direction of said device, said object plane being fixed, a variable power means being provided for moving said movable base in said optical axis directions to change the distance between said object plane and said movable base upon varying said magnification, and correcting means for moving said movable lens group on said movable base to a predetermined position in accordance with said movement of said movable base.

20. A magnification varying optical device according to claim 19, further comprising a charge-coupled device provided on said light receiving surface.

21. A magnification varying optical device according to claim 19, further comprising a stationary base having a guide bar secured thereto, said movable base being movably supported by said guide bar, a pulse motor which controls said movement of said movable base, said movable base having a cam lever pivoted thereto which is connected at one end to the one of said main or said correcting lens group which is movably supported on said movable base, and cam surface means which are engaged by a cam lever at an opposite end of said cam surface to move the movably supported lens group to a predetermined position in accordance with said movement of said movable base.

22. A magnification varying optical device according to claim 21, wherein said cam surface means comprises a cam surface integral with said stationary base.

23. A magnification varying optical device according to claim 21, further comprising an additional pulse motor which drives the movable lens group.

24. A magnification varying optical device according to claim 23, further comprising a gear train connected to an additional pulse motor to drive said movable lens group.

25. A magnification varying optical device, said device having a fixed object plane on which an object is to be located, a fixed light receiving surface, and an imaging lens for focusing an image of said object located on said object plane onto said light receiving surface, so that upon varying said magnification, an optical distance between said object plane and said light receiving surface can be changed, wherein said imaging lens comprises a main lens group and a correcting lens group that are movable relative to each other, one of said main lens group and said correcting lens group being fixed with respect to said light receiving surface, adjusting means for adjusting the movement of the movable lens group, a first carriage which includes an illumination light source for scanning a fixed object plane, and a first mirror which is adapted to reflect light reflected by said object plane into a direction that is parallel with said object plane, a second carriage which includes a second mirror and a third mirror which is adapted to reflect said light reflected by said first mirror into an opposite direction to be incident upon said imaging lens unit, a scan driving means for moving said first and second carriages in a direction parallel with said object plane, and an object-image distance adjusting means for changing an initial positional relationship between said first and second carriages in accordance with said magnification.

26. A magnification varying optical device according to claim 25, wherein said scan driving means comprises a pair of endless wires connected to said first and second carriages, a pair of coaxial pulleys around which said endless wires are wound and which have a diameter ratio of approximately 1:2, and a pulse motor for rotating said coaxial pulleys.

27. A magnification varying optical device according to claim 26, wherein said object-image distance adjusting means comprises a clutch mechanism provided between said pulleys.

28. A magnification varying optical device according to claim 27, further comprising a movable base to which one of said main lens group and said correcting lens group, and said light receiving surface, are secured, the other lens group being supported on said movable base so as to move in the optical direction.

29. A magnification varying optical device according to claim 28, further comprising a stationary base having a guide bar which movably supports said movable base.

30. A magnification varying optical device according to claim 29, further comprising an additional pulse motor for moving the movable lens group.

31. A magnification varying optical device according to claim 30, further comprising a gear train connected to said additional pulse motor to transmit rotation of said additional pulse motor to said movable lens group.

32. A magnification varying optical device according to claim 25, wherein said scan driving means comprises means for moving said first and second carriages at a speed ratio of approximately 2:1.

33. A magnification varying optical device, said device comprising a first carriage which includes an illumination light source for scanning a fixed object plane and a first mirror which is adapted to reflect light reflected by an object plane into a direction parallel with said object plane, a second carriage which includes second and third mirrors which are adapted to reflect the light reflected by said first mirror into an opposition direction to be incident upon an imaging lens, a scan driving means for moving said first and second carriages in a direction parallel with said object plane, and an object-image distance adjusting means for changing an initial positional relationship between said first and second carriages in accordance with said magnification.

34. A magnification varying optical device according to claim 33, wherein said scan driving means comprises a pair of endless wires connected to said first and second carriages, a pair of coaxial pulleys around which said endless wires are wound and which have a diameter ratio of approximately 1:2, and a pulse motor for rotating said coaxial pulleys.

35. A magnification varying optical device according to claim 34, wherein said object-image distance adjusting means comprises a clutch mechanism provided between said pulleys.

36. A magnification varying optical device according to claim 33, wherein said scan driving means comprises means for moving said first and second carriages at a speed ratio of approximately 2:1.

* * * * *

UNITED STATES PATENT AND TRADEMARK OFFICE
CERTIFICATE OF CORRECTION

PATENT NO. : 4,974,948

DATED : December 4, 1990

Page 1 of 2

INVENTOR(S) : YASUNORI ARAI et al.

It is certified that error appears in the above-identified patent and that said Letters Patent is hereby corrected as shown below:

On the title page and Col. 1, line 1,     change "MAGIFICATION" to ---MAGNIFICATION---.

In the drawings, change number of "Sheet 25" to ---Sheet 26 --- and "Sheet 26" to ---Sheet 25---.

At column 1, line 54, insert ---of--- before "a".

At column 2, line 1, insert ---which are--- before "movable".

At column 2, line 4, delete "so as" and insert ---,--- after "surface".

At column 2, line 6, insert ---so as--- after "surface".

At column 2, line 21, insert ---,--- before "which".

At column 2, line 30, delete "magnification".

At column 2, line 53, change "group, the" to ---group is attached. The---.

At column 2, line 56, change "the" (first occurrence) to ---a---.

At column 3, line 16, change "mean for scanning"   to ---means for scanning---.

At column 3, line 26, insert ---,--- after "movable".

At column 4, line 6, insert ---,--- before and after "respectively".

At column 4, line 10, insert ---,--- before and after "respectively".

At column 4, line 19, insert ---,--- before and after "respectively".

At column 4, line 23, insert ---,--- before and after "respectively".

At column 4, line 39, change "aberation" to ---aberration---.

At column 6, line 16, delete "," after "22".

UNITED STATES PATENT AND TRADEMARK OFFICE
CERTIFICATE OF CORRECTION

PATENT NO. : 4,974,948

DATED : December 4, 1990

INVENTOR(S) : YASUNORI ARAI et al.

It is certified that error appears in the above-identified patent and that said Letters Patent is hereby corrected as shown below:

At column 6, line 48, insert ---,--- before and after "respectively".

At column 6, line 55, insert ---,--- before and after "respectively".

At column 7, line 50-51, change "arrangemnt" to ---arrangement---.

At column 8, line 14, change "eceiving" to ---receiving---.

At column 11, line 50, change "adjutment" to ---adjustment---.

At column 12, line 20, insert ---approximately--- after "of".

Signed and Sealed this

Third Day of August, 1993

Attest:

MICHAEL K. KIRK

*Attesting Officer*　　　*Acting Commissioner of Patents and Trademarks*